United States Patent
Teraura

(10) Patent No.: US 10,769,397 B2
(45) Date of Patent: Sep. 8, 2020

(54) OPTICAL CODE, METHOD OF PRODUCING OPTICAL CODE, METHOD OF AUTHENTICATING OPTICAL CODE, DEVICE FOR READING OPTICAL CODE, AND READING ASSIST DEVICE

(71) Applicants: DENSO WAVE INCORPORATED, Chita-gun, Aichi-pref (JP); TERRARA CODE RESEARCH INSTITUTE, INC., Tokai-shi, Aichi (JP)

(72) Inventor: Nobuyuki Teraura, Tokai (JP)

(73) Assignees: DENSO WAVE INCORPORATED, Aichi-pref. (JP); TERRARA CODE RESEARCH INSTITUTE, INC., Tokai-shi (JP)

( * ) Notice: Subject to any disclaimer, the term of this patent is extended or adjusted under 35 U.S.C. 154(b) by 0 days.

(21) Appl. No.: 16/063,307

(22) PCT Filed: Dec. 19, 2016

(86) PCT No.: PCT/JP2016/087833
§ 371 (c)(1),
(2) Date: Sep. 27, 2018

(87) PCT Pub. No.: WO2017/104856
PCT Pub. Date: Jun. 22, 2017

(65) Prior Publication Data
US 2019/0018994 A1 Jan. 17, 2019

(30) Foreign Application Priority Data

Dec. 17, 2015 (JP) .................................. 2015-246195
Dec. 14, 2016 (JP) .................................. 2016-241912

(51) Int. Cl.
*G06K 7/10* (2006.01)
*G06K 7/12* (2006.01)
(Continued)

(52) U.S. Cl.
CPC ........... *G06K 7/12* (2013.01); *G06K 7/10742* (2013.01); *G06K 7/1417* (2013.01);
(Continued)

(58) Field of Classification Search
CPC ......... C09D 5/22; G06K 9/2036; G06K 19/14
(Continued)

(56) References Cited

U.S. PATENT DOCUMENTS 7,264,169 B2 * 9/2007 Juds ................... G06K 7/10732
235/462.01
7,966,267 B2 * 6/2011 Auslander .............. B41M 3/144
235/435
(Continued)

FOREIGN PATENT DOCUMENTS

JP 2007-193387 A 8/2007
JP 2008-197694 A 8/2008
(Continued)

OTHER PUBLICATIONS

Mar. 14, 2017 International Search Report issued in International Patent Application No. PCT/JP2016/087833.

*Primary Examiner* — Daniel St Cyr
(74) *Attorney, Agent, or Firm* — Oliff PLC

(57) ABSTRACT

An optical code is readable by a generally used reading device, and optically readable as an information code that can appropriately prevent abuse due to duplication. In this optical code, data is recorded with a pattern of a plurality of light-color modules having high visible light reflectance and a plurality of dark-color modules having visible light reflectance lower than light-color modules. At least either the light-color modules or the dark-color modules are configured to include a first module and a second module having reflectances different from each other for invisible light of a predetermined wavelength. Thus, data is recorded as a
(Continued)

readable pattern of modules, the pattern being differently observed between when irradiated with visible light and when irradiated with the invisible light of a predetermined length.

18 Claims, 10 Drawing Sheets

(51) Int. Cl.
  *G06K 7/14* (2006.01)
  *G06K 19/06* (2006.01)
(52) U.S. Cl.
  CPC ......... *G06K 7/1434* (2013.01); *G06K 7/1447* (2013.01); *G06K 19/0614* (2013.01); *G06K 19/06037* (2013.01); *G06K 2019/06225* (2013.01)

(58) Field of Classification Search
  USPC ............... 235/468, 462.9, 462.1, 462.14
  See application file for complete search history.

(56) References Cited

U.S. PATENT DOCUMENTS

| | | | |
|---|---|---|---|
| 8,616,460 B2* | 12/2013 | Kurtz | B44F 1/10 235/454 |
| 8,931,701 B2* | 1/2015 | Lawandy | G06K 7/12 235/462.09 |
| 2012/0153025 A1 | 6/2012 | Ito et al. | |

FOREIGN PATENT DOCUMENTS

| | | |
|---|---|---|
| JP | 2012-133743 A | 7/2012 |
| JP | 2013-004024 A | 1/2013 |
| JP | 2014-071468 A | 4/2014 |

\* cited by examiner (a) UNDER VISIBLE LIGHT (b) UNDER INFRARED LIGHT (a) IN THE CASE OF VISIBLE LIGHT (b) IN THE CASE OF INFRARED LIGHT

OPTICAL CODE, METHOD OF PRODUCING OPTICAL CODE, METHOD OF AUTHENTICATING OPTICAL CODE, DEVICE FOR READING OPTICAL CODE, AND READING ASSIST DEVICE

CROSS-REFERENCE TO RELATED APPLICATION

This application is based on and claims the benefit of priority from earlier Japanese Patent Applications No. 2015-246195 filed on Dec. 17, 2015 and No. 2016-241912 filed on Dec. 14, 2016, and the description of which are incorporated herein by reference.

BACKGROUND

Technical Field

The present invention relates to an optical code as an information code capable of recording information in the form of an optically readable pattern that is a combination of a plurality of types of modules, a method of producing the information code, and method and device for reading the information code.

Related Art

Commercial products or cash vouchers of recent years are provided with an optical code which keeps a record of the information used for managing commercial products or the like. Since generally used optical codes have a light-dark pattern that can be easily duplicated by use of a copying machine, there is a concern that the optical codes of commercial products or cash vouchers may be duplicated and abused. To prevent production of duplicates of optical codes, there is proposed a configuration of covering an optical code with a shielding layer that does not transmit visible light but transmits infrared light (e.g., see PTL 1). Such an optical code keeps a record of data that is in the form of a pattern of modules having high or low reflectance, and cannot be duplicated by use of a copying machine because visible light applied by the lighting of the copying machine is shielded by the shielding layer.

PATENT LITERATURES

[PTL 1] JP 2012-133743 A

The optical code disclosed by PTL 1 is capable of preventing production of a duplicate by use of a copying machine, but needs to use a dedicated reading device to read the information recorded in the optical code. Since ordinarily used reading devices cannot be used for this optical code, an optical code that is readable by an ordinarily used reading device has to be newly provided.

SUMMARY

Thus it is desired to provide an optical code that is readable by an ordinarily used reading device and can suitably prevent abuse thereof that would otherwise be done by producing a duplicate.

An optical code used for recording data with a pattern of a plurality of light-color modules having high visible light reflectance, and a plurality of dark-color modules having low visible light reflectance, is provided. The optical code is characterized in that at least either the light-color modules or the dark-color modules include a first module and a second module having reflectances different from each other for invisible light of a predetermined wavelength, and are recorded as a module pattern that is different between when irradiated with visible light and when irradiated with the invisible light having a predetermined wavelength.

Similarly to the typical optical codes, the optical code of the present disclosure records data with a pattern of the light-color modules and the dark-color modules. Accordingly, the data can be read with a generally used optical code reading device.

When the optical code of the present disclosure is duplicated using a copying machine, the pattern of the first and second modules present in the original copy is lost. Copying machines typically provide reproduction only based on the reflectance for visible light (colors) without taking account of the reflectance of the modules for infrared light. Therefore, in the duplicate, all the dark-color modules will be printed in a dark color with the same ink, and the reflectance for the invisible light of a predetermined wavelength will be the same in all the dark-color modules. This is why the pattern of the first and second modules is lost in the duplicate. Therefore, the optical code of the present disclosure uses a dedicated device capable of measuring reflectance of invisible light of a predetermined wavelength. Using this device, the pattern of the first and second modules is identified to thereby discriminate between an original optical code and a duplicate.

Thus, since data of the optical code of the present disclosure is readable with a generally used optical code reading device, the information recorded in the optical code can be read by a great many people at low cost. Furthermore, since the original and the duplicate are discriminated based on the pattern of the first and second modules, abuse by duplication is appropriately prevented. Abuse of duplicates is appropriately prevented by an unannounced or random inspection, and therefore use of only a smaller number of dedicated reading devices suffices for discrimination of duplicates. Specifically, the optical code of PTL 1 necessitates all the individuals wishing to read the optical code to possess a dedicated reading device capable of measuring reflectance of invisible light. Therefore, this optical code in question is inappropriate as an optical code for transmitting information to a great number of individuals wishing to read the optical code. In this regard, the optical code of the present disclosure has an advantage of enabling reading with a generally used optical code reading device. Although the optical code of the present disclosure requires to use a dedicated device to detect a duplicate, use of only a fewer number of such dedicated devices will suffice. Thus, the dedicated devices can be introduced at low cost to optical codes for transmitting information to a great number of individuals.

The invisible light of a predetermined wavelength of the present disclosure may be ultraviolet light or infrared light; however, the invisible light of a predetermined wavelength is preferably infrared light. This is because, when infrared light is used, the irradiation device to be produced can be made compact with a to reduced weight and cost compared to ultraviolet light.

As a specific aspect of the present disclosure, it is proposed that: the dark-color modules are formed on a front surface of a light-color base layer having high reflectance for visible light and the invisible light having a predetermined wavelength; the first module and the second module are included in the dark-color modules; in a portion for forming the first module, a first dark-color layer is formed on the front surface of the light-color base layer, the first dark-color layer transmitting the invisible light of a predetermined wavelength and having a dark color; in a portion for forming the second module, a second dark-color layer is formed on the front surface of the light-color base layer, the second dark-color layer absorbing the invisible light of a predetermined wavelength and having a dark color; and the first module has higher reflectance for the invisible light of a predetermined wavelength, compared to the second module.

In the configuration set forth above, it is proposed that the first dark-color layer is formed of an invisible light transmissive layer that transmits the invisible light of a predetermined wavelength; and the second dark-color layer is formed of an invisible light absorptive layer that at least absorbs the invisible light of a predetermined wavelength. Such an optical code can be produced at low cost if the invisible light of a predetermined wavelength is infrared light. Specifically, a typical white color base reflects invisible light and visible light. Therefore, using the white color base as a light-color base layer, the optical code can be easily formed by printing the first and second dark-color layers with an infrared light absorptive ink. In addition, since most of the general-purpose dye inks are infrared light transmissive inks, and most of the general-purpose pigment inks are infrared light absorptive inks, all of the light-color base layer, the first dark-color layer and the second dark-color layer can be achieved using inexpensive materials.

The present disclosure provides the optical code affixed to at least any of a product, a product package and a product tag. In the to present disclosure, it is proposed that the data recorded with a pattern of the light-color modules and the dark-color modules includes information used for product management. The product package is not limited to a package for an individual product, but may include cardboard boxes or pallets containing or loading a plurality of products.

With this configuration, the data recorded in the optical code is read during product management, such as when products are received or shipped, or when an inventory check is performed. Thus, during product management, an inauthentic product that uses a duplicate of the optical code is checked concurrently with reading the optical code.

In the present disclosure, there is proposed a configuration in which the first module includes: a first invisible light reflective dark-color module having high reflectance for the invisible light of a predetermined wavelength and high reflectance for invisible light of a second predetermined wavelength that is different from that of the invisible light of a predetermined wavelength; and a second invisible light reflective dark-color module having high reflectance for the invisible light of a predetermined wavelength and low reflectance for the invisible light of a second predetermined wavelength. In the configuration: the first invisible light reflective dark-color module is formed of a layer that is formed on the front surface of the light-color base layer, the layer of the first invisible light reflective dark-color module transmitting both the invisible light of a predetermined wavelength and the invisible light of a second predetermined wavelength and having a dark color; and the second invisible light reflective dark-color module is formed of a layer that is formed on the front surface of the light-color base layer, the layer of the second invisible light reflective dark-color module transmitting the invisible light of a predetermined wavelength, absorbing the invisible light of a second predetermined wavelength and having a dark color.

With this configuration, it is at least necessary to form three kinds of dark-color layers with different transmission characteristics for invisible light, so that counterfeiting of the optical code becomes difficult.

As a specific aspect of the present disclosure, it is proposed that: the dark-color modules are formed on the front surface of the light-color base layer having high reflectance for visible light and the invisible light of a predetermined wavelength; the first module and the second module are included in the dark-color modules; in a portion for forming the first module, a first dark-color layer is formed on the front surface of the light-color base layer, the first dark-color layer partially transmitting the invisible light of a predetermined wavelength and having a dark color; in a portion for forming the second module, a second dark-color layer is formed on the front surface of the light-color base layer, the second dark-color layer absorbing the invisible light of a predetermined wavelength and having a dark color; and the first module has higher reflectance for the invisible light of a predetermined wavelength, compared to the second module, and has lower reflectance for the invisible light of a predetermined wavelength, compared to the light-color modules. With this configuration, the light-color modules, the first module and the second module can be discriminated from one another according to the reflectance for the invisible light of a predetermined wavelength. Therefore, measurement of the reflectance of each module for the invisible light of a predetermined wavelength enables reading of data recorded with a pattern of the light- and dark-color modules and enables determination as to whether the optical code is a duplicate, without the need of measuring the reflectance for visible light.

In the present disclosure, there is proposed a configuration in which: the optical code includes a fixed region where positions of the light-color modules and the dark-color modules are determined in advance to configure a pattern assisting optical reading; and at least either the light-color modules or the dark-color modules included in the fixed region are made up of the first module and the second module, with positions of the first module and the second module being determined in advance.

With this configuration, by only detecting the reflectance of a module at a predetermined position for the invisible light, the optical code can be determined as to whether it is the original or a duplicate. Thus, duplicates of the optical code of the present disclosure can be easily detected.

In the present disclosure, there is proposed a configuration in which data is recorded with a pattern of the first module and the second module.

With this configuration, high secrecy data can be recorded in the optical code. From such an optical code, the high secrecy data is difficult to be read with a generally used optical code reading device but can be read with a dedicated device capable of measuring the reflectance of each module to invisible light.

In the present disclosure, there is proposed a configuration in which: the first module and the second module are included in either the light-color modules or the dark-color modules; and data recorded with a pattern of the first module and the second module includes data in which information of predetermined contents are encrypted.

With this configuration, the optical code is authenticated based on whether the information of predetermined contents is correctly recorded with a pattern of the first and second modules. This method of authentication enables detection of not only a duplicate of the optical code but also a counterfeit optical code with falsified data. A counterfeit optical code that falsifies the data recorded with a pattern of the light- and dark-color modules includes light- and dark-color modules whose positions are different from those of the original. Therefore, the counterfeiter who does not know the encryption key used for encrypting the data is not able to record information on the counterfeit optical code with the same contents as in the original. Therefore a counterfeit optical code can be detected. Thus, with the configuration set forth above, distribution of counterfeit optical codes having falsified data can be appropriately prevented.

In the present disclosure, it is preferred that the light-color modules are white and the dark-color modules are black. With this configuration, the optical code of the present disclosure will have an appearance similar to that of an existing typical optical code, to the naked eye.

As another aspect of the present disclosure, there is proposed a method of producing an optical code used for recording data with a pattern of a plurality of light-color modules having high visible light reflectance, and a plurality of dark-color modules having low visible light reflectance. The method is characterized in that it includes: a first step of deciding a pattern of the light-color modules and the dark-color modules of the optical code used for recording required data; a second step of deciding either a first module having high reflectance for invisible light of a predetermined wavelength or a second module having low reflectance for the invisible light of a predetermined wavelength, for each of the dark-color modules decided in the first step; and a third step of forming the first module on a front surface of a light-color base layer having high reflectance for visible light and the invisible light of a predetermined wavelength by providing a first dark-color layer that transmits the invisible light of a predetermined wavelength, and forming the second module on the front surface of the light-color base layer by providing a second dark-color layer that absorbs the invisible light of a predetermined wavelength. According to this method of production, the optical code of the present disclosure can be easily produced.

As another aspect of the present disclosure, there is proposed a method of authenticating an optical code, the optical code being used for recording data with a pattern of a plurality of light-color modules having high visible light reflectance, and a plurality of dark-color modules having low visible light reflectance lower, at least either the light-color modules or the dark-color modules being configured by a first module and a second module having reflectances different from each other. The method is characterized in that the it includes: a visible light imaging step of capturing an image of the optical code in visible light; an invisible light imaging step of capturing an image of the optical code with the invisible light of a predetermined wavelength; a visible light discriminating step of discriminating between the light-color modules and the dark-color modules, for at least part of modules included in the optical code, based on an image captured in the visible light imaging step; an invisible light discriminating step of discriminating between a module having high reflectance for the invisible light of a predetermined wavelength and a module having low reflectance for the invisible light of a predetermined wavelength, for at least part of modules included in the optical code, based on an image captured in the invisible light imaging step; an invisible light module discriminating step of discriminating between the first module and the second module, for at least part of modules, based on results of the visible light discriminating step and the invisible light discriminating step; and an authenticating step of authenticating the optical code, based on a pattern of the first module and the second module, the pattern being discriminated at least in the invisible light module discriminating step.

According to this method of authentication, a duplicate of the optical code of the present disclosure can be easily found.

As another aspect of the present disclosure, a reading device for an optical code is proposed, the optical code being configured to record data with a pattern of a plurality of light-color modules having high visible light reflectance, and a plurality of dark-color modules having low visible light reflectance, at least either the light-color modules or the dark-color modules being configured by a first module and a second module having reflectances different from each other. The reading device is characterized in that the reading device includes: an irradiation unit that applies visible light and the invisible light of a predetermined wavelength to the optical code; and an imaging unit capable of capturing an image in reflected light which is a reflection of the light applied to the optical code from the irradiation unit. In the reading device, the imaging unit includes: visible light recorded data reader capable of reading the information, based on a pattern of modules obtained from an image captured in reflected light that is a reflection of visible light; and an invisible light recorded data reader capable of reading the information, based on a pattern of modules obtained from an image captured in reflected light that is a reflection of the invisible light of a predetermined wavelength.

The reading device set forth above may further includes an authentication unit that authenticates the data, based on information read by the visible light recorded data reader and information read by the invisible light recorded data reader. With this configuration, the task of reading data recorded in the optical code of the present disclosure and the task of authenticating the optical code can be concurrently carried out.

As another aspect of the present disclosure, there is proposed a reading device for an optical code, the optical code being used for recording data with a pattern of a plurality of light-color modules having high visible light reflectance, and a plurality of dark-color modules having low visible light reflectance, either the light-color modules or the dark-color modules being configured by a first module and a second module having reflectances different from each other. The reading device includes: an imaging unit that is provided with an imaging device capable of capturing an image in visible light and invisible light; an invisible light filter that shields visible light and transmits the invisible light of a predetermined wavelength; a visible light filter that shields the invisible light of a predetermined wavelength and transmits visible light; a mount/demount mechanism that is capable of mounting/demounting the visible light filter and the visible light filter to/from a light path; and an irradiation unit that is capable of emitting at least the invisible light of a predetermined wavelength. The reading device is configured to execute: a visible light imaging process of capturing an image of the optical code, with the invisible light filter being demounted from the light path and the visible light filter being mounted to the light path; an invisible light imaging process of capturing an image of the optical code imaged in the visible light imaging process, with the visible light filter being demounted from the light path and the invisible light filter being mounted to the light path; a visible light recording data reading process of reading the data, based on an image captured in the visible light imaging process; and an authenticating process of authenticating the optical code, at least based on an image captured in the visible light imaging process. Using such a reading device, the task of reading data recorded in the optical code of the present disclosure and the task of authenticating the optical code can be concurrently carried out.

Furthermore, there is proposed a reading assist device that allows a smartphone (cellular phone) to read a pattern of the modules readable when visible light is applied to the optical code according to disclosure, and a pattern of the modules readable when the invisible light of a predetermined wavelength is applied to the optical code. The reading assist device is characterized in that the it includes: a housing that has at least a top plate and side walls and is configured to arrange the optical code at a bottom portion; an irradiation unit that is disposed inside the housing to apply the invisible light of a predetermined wavelength to the bottom portion of the housing; and a control unit that controls application of the invisible light of a predetermined wavelength by the irradiation unit. In the reading assist device: the top plate of the housing is provided with a camera opening enabling passage of at least visible light and the invisible light of a predetermined wavelength, with an illumination opening enabling passage of at least visible light being formed near the camera opening; the reading assist device further includes a light-receiving sensor inside the housing to detect light passing through the illumination opening; and the control unit allows the irradiation unit to apply the invisible light of a predetermined wavelength under conditions that no light passing through the illumination opening is being detected by the light-receiving sensor, and does not allow the irradiation unit to apply the invisible light of a predetermined wavelength when light passing through the illumination opening is at least being detected by the light-receiving sensor.

DESCRIPTION OF THE EMBODIMENTS

Embodiments of various modes of the present invention will be described.

First Embodiment

An optical code 1 of the present embodiment is affixed to medication packaging boxes and used for product management. The optical code 1 is an information code which can be used to recode information based on a combination of a plurality of types of modules and to optically read information recorded as such a combined pattern. The optical code 1, when read in visible light, is compatible with a QR code (registered trademark) which is most widespread among two-dimensional information codes. The optical code 1 has a basic structure based on the QR code. Specifically, as shown in part (a) of FIG. 1, the optical code 1 of the present embodiment is provided with square modules 2 which are arranged in a 21×21 matrix. The modules 2 include light-color (white) modules 2a arranged to increase reflectance of visible light, and dark-color (black) modules 2b arranged to decrease reflectance of visible light. Data is recorded in the optical code 1 with a pattern of the light-color modules 2a and the dark-color modules 2b.

Figure 1:
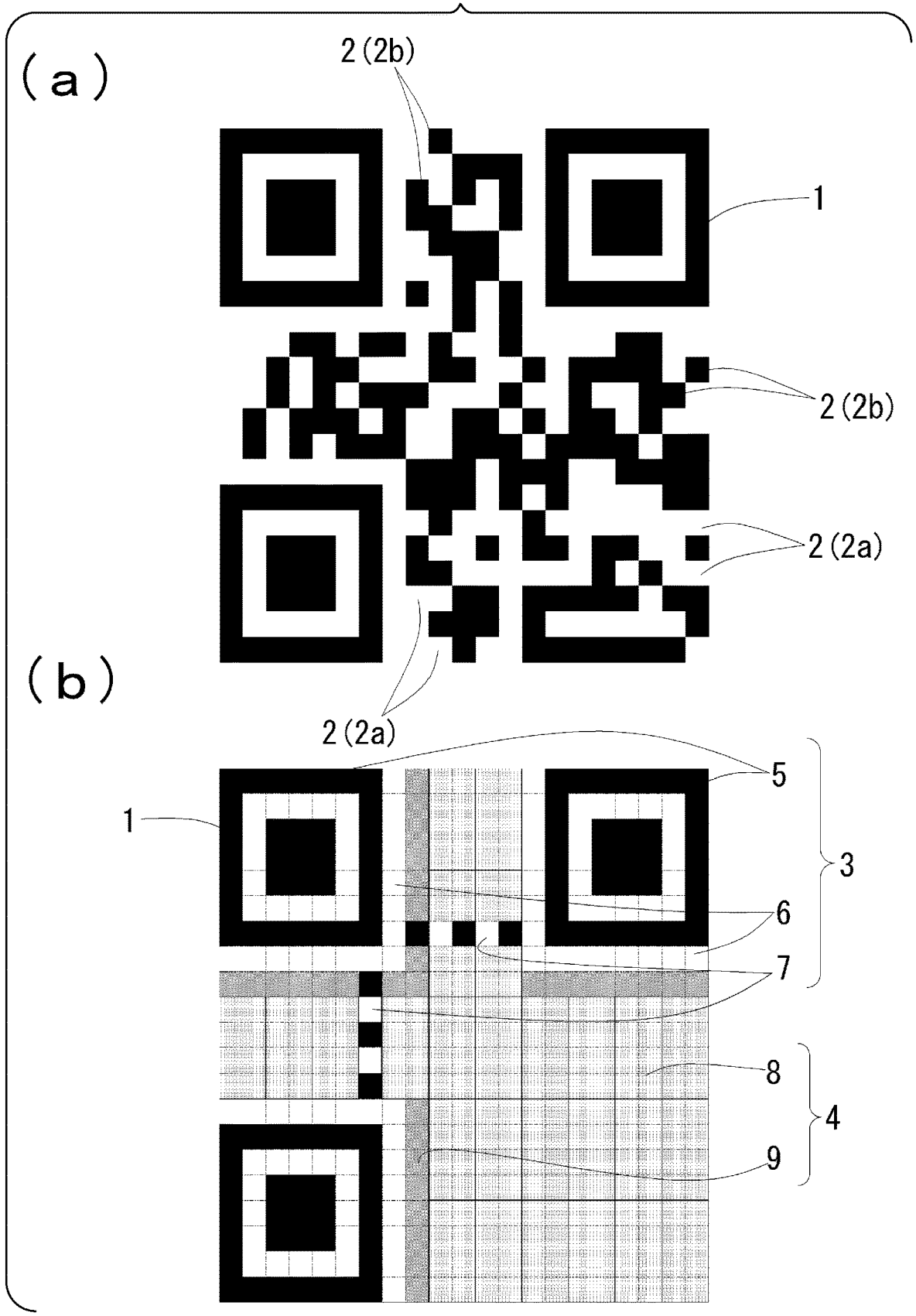
FIG. 1 is a set of diagrams in which part (a) illustrates an optical code 1 according to a first embodiment, and part (b) illustrates the optical code 1 of the first embodiment, with regions being defined on a functional basis.

As shown in part (b) of FIG. 1, the optical code 1 is configured, similarly to the QR code, by a functional pattern (fixed region) 3 and an encoded region 4. The functional pattern 3 corresponds to a region of the QR code where the positions of the light-color modules 2a and the dark-color modules 2b are predetermined. The functional pattern 3 is configured by a position detection pattern 5, a separation pattern 6, a timing pattern 7, and the like, which assist optical reading of the optical code 1. The encoded region 4 corresponds to a region where data is recorded with a pattern of the light- and cark-color modules 2a and 2b. The to encoded region 4 is configured by a data code region 8 where data codewords and error codewords are recorded, and a format information code region 9 where codes indicating format information are arranged. Since this configuration is based on the JIS standard (JIS X 0510: 2004) of QR codes, specific description is omitted.

Figure 2:
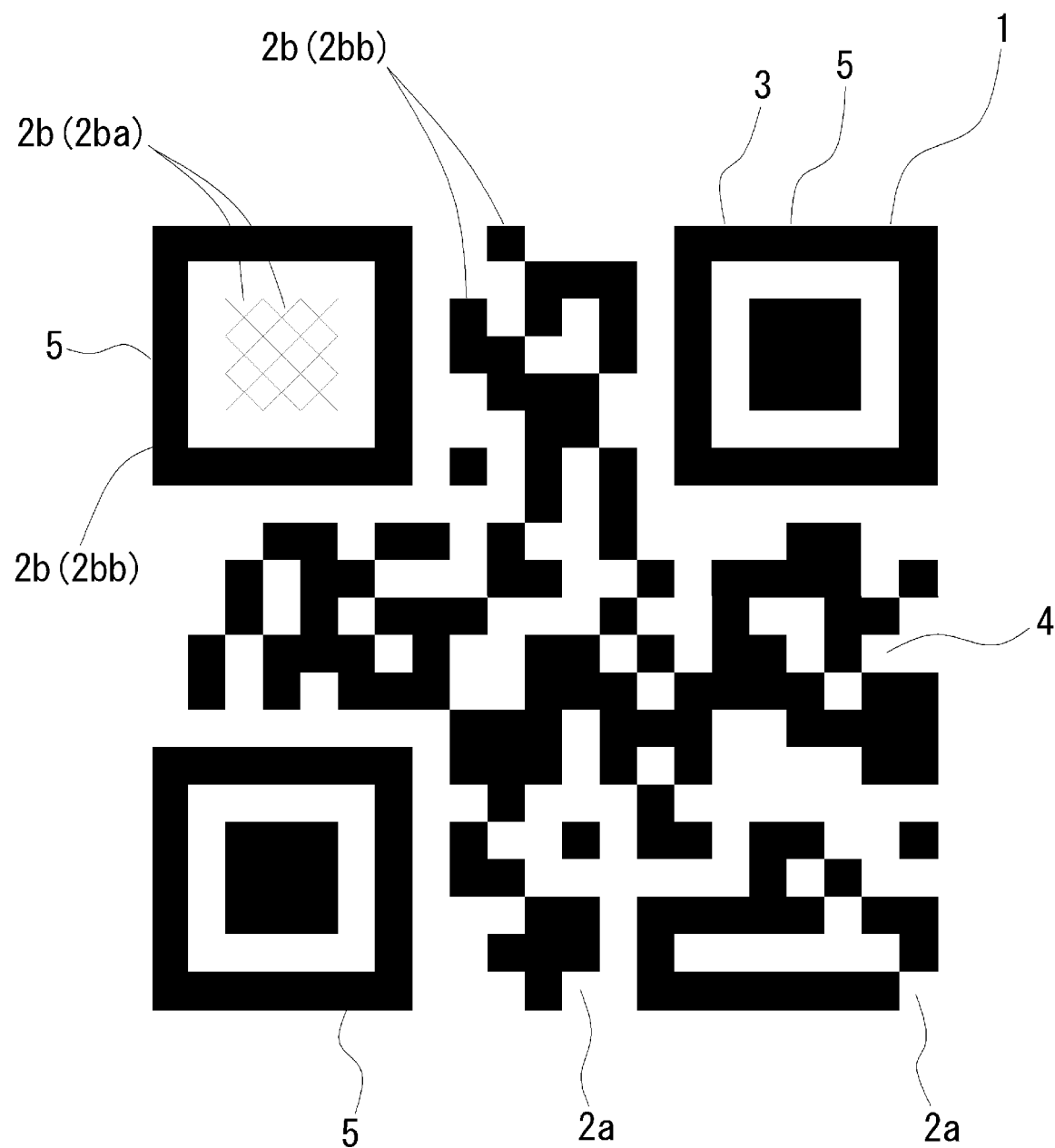
FIG. 2 is a diagram illustrating the optical code 1 in which an infrared light reflective dark-color module 2ba is discriminated from an infrared light absorptive dark-color module 2bb.

The dark-color modules 2b of the optical code 1 of the present embodiment are made up of infrared light reflective dark-color modules 2ba having high reflectance for infrared light with a wavelength of 1,000 nm (hereinafter simply termed infrared light except for fourth embodiment), and infrared light absorptive dark-color modules 2bb having low reflectance for infrared light. Specifically, in FIG. 2, those modules which are represented by white are light-color modules 2a, those which are represented by a mark X are infrared light reflective dark modules 2ba, and those which are represented by black are infrared light absorptive dark modules 2bb. In the present embodiment, the dark-color modules 2b configuring the position detection pattern 5 on the upper left in the functional pattern 3 form a characteristic pattern. The characteristic pattern specifically includes the infrared light reflective dark-color modules 2ba and the infrared light absorptive dark-color modules 2bb (termed authentic product identifier pattern hereinafter).

Specifically, the dark-color modules 2b configuring the upper-left position detection pattern 5 have a square at the center. The square is configured by 9 dark-color modules which are the infrared light reflective dark-color modules 2*ba*. The square has an outer peripheral portion which is configured by 24 dark-color modules which are the infrared light absorptive dark-color modules 2*bb*. The rest of the dark-color modules of the functional pattern 3 and all the dark-color modules of the encoded region are all infrared light absorptive dark-color modules 2*bb*. The infrared light reflective dark-color modules 2*ba* can be clearly discriminated from the infrared light absorptive dark-color modules 2*bb* by measuring the reflection characteristics for infrared light. However, both of them are black when seen in visible light and accordingly it is difficult to discriminate between them.

The light-color modules 2*a* are only made up of those modules which have high reflectance for visible light and infrared light. Specifically, in the modules 2 of the optical code 1 of the present embodiment, the light-color modules 2*a* having high visible light reflectance can be discriminated from the dark-color modules 2*b* having low visible light reflectance, by measuring visible light reflectance (brightness). Further, the infrared light absorptive dark-color modules 2*bb* having low infrared reflectance can be discriminated from other modules (the light-color modules 2*a* and the infrared light reflective dark-color modules 2*ba*) having high infrared reflectance.

Figure 3:
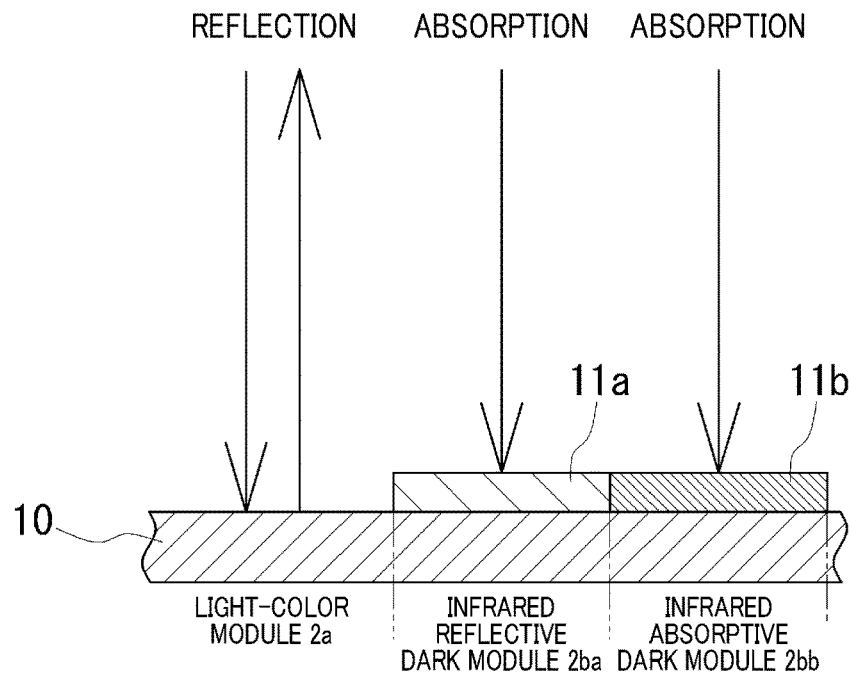
FIG. 3 is a set of diagrams illustrating characteristics of modules.
Figure 3:
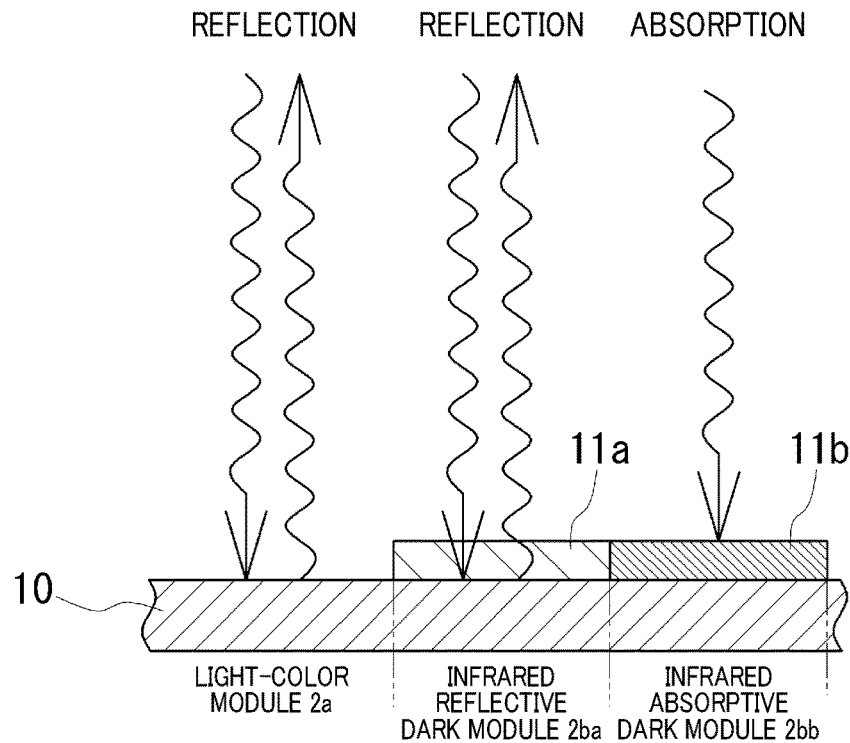

The optical code 1 of the present embodiment is prepared by forming layers of black inks 11*a* and 11*b* by printing on a surface of a white paper base material 10 configuring the packaging box. Specifically, as shown in part (a) of FIG. 3, the surface of the paper base material 10 includes an exposed portion where layers of the black inks 11*a* and 11*b* are not printed to serve as the light-color modules 2*a* with high visible light reflectance, and includes a portion where layers of the black inks 11*a* and 11*b* are formed to serve as the dark-color modules 2*b* with low visible light reflectance.

The black inks 11*a* and 11*b* are specifically two kinds of inks, i.e. infrared light transmissive black ink 11*a* that transmits infrared light and infrared light absorptive black ink 11*b* that absorbs infrared light. The paper base material 10 has high reflectance for infrared light. As shown in part (b) of FIG. 3B, the portion in which a layer of the infrared light transmissive black ink 11*a* is formed (corresponding to the first dark-color layer of the present disclosure) serves as the infrared light reflective dark-color modules 2*ba* where infrared light transmits through the ink 11*a* and reflected by the paper base material 10.

The portion in which a layer of the infrared light absorptive black ink 11*b* is formed (corresponding to the second dark-color layer of the present disclosure) serves as the infrared light absorptive dark-color modules 2*bb* where infrared light is absorbed by the ink 11*b*. White paper base materials generally have high infrared reflectance, black dye inks generally transmit infrared light, and black pigment inks generally absorb infrared light. Accordingly, the optical code 1 of the present embodiment can be prepared by using generally used materials.

The optical code 1 of the present embodiment can be prepared, for example, using a method including the following steps.

(1) Preparation of Data to be Recorded

Data to be recorded in the encoded region 4 is prepared using a pattern of the light-color modules 2*a* and the dark-color modules 2*b*.

(2) Preparation of Data Based on QR Code

A QR code is prepared to record data prepared in step (1). Specifically, a pattern of the light- and dark-color modules 2*a* and 2*b* in the optical code 1 is decided. Since this step can be realized according to well-known QR code preparing methods, detailed description is omitted.

(3) Designation of Infrared Light Reflective Dark-Color Modules and Infrared Light Absorptive Dark-Color Modules For the dark-color modules 2*b* decided in step (2), it is determined whether to use the infrared light reflective dark-color modules 2*ba* or the infrared light absorptive dark-color modules 2*bb*. Specifically, the 9 dark-color modules 2*b* configuring the center portion of the upper-left position detection pattern 5 in the functional pattern 3 are designated as the infrared light reflective dark-color modules 2*ba*, and all the rest of the dark-color modules 2*b* are designated as the infrared light absorptive dark-color modules 2*bb*.

Through these steps, the kinds of all the modules 2 of the optical code 1 are decided.

(4) Printing

The optical code 1 is printed onto the white paper base material 10 configuring a packaging box, using the black inks 11*a* and 11*b*. Specifically, a layer of the infrared light transmissive black ink 11*a* is formed on the front surface of the paper base material 10 to print thereon the black infrared light reflective dark-color modules 2*ba*. Also, a layer of the infrared light absorptive black ink 11*b* is formed on the front surface of the paper base material 10 to print thereon the black infrared light absorptive dark-color modules 2*bb*. The light-color modules 2*a* are formed by the paper base material 10 exhibiting the white color on the surface, with neither of the inks 11*a* and 11*b* being printed. The printing step may be performed using a plate, or may be performed using a printer (ink-jet printer or laser printer).

When the optical code 1 of the present embodiment is read by a generally used QR code reading device (e.g., a smartphone), each light-color module 2*a* is discriminated as a light-color module, while each dark-color module 2*b* is discriminated as a dark-color module. This is because such a generally used QR code reading device identifies light and dark in each module 2 based on only the reflection characteristics (brightness) of visible light. Since the pattern of the light- and dark-color modules 2*a* and 2*b* are based on the QR code standards, the information recorded in the optical code 1 is readable by an ordinarily used QR code reading device through the pattern of the light- and dark-color modules 2*a* and 2*b*. Thus, the optical code 1 of the present embodiment is compatible with a QR code when read in visible light.

When the optical code 1 of the present embodiment is duplicated by a copying machine, the infrared light reflective dark-color modules 2*ba* and the infrared light absorptive dark-color modules 2*bb* are recognized to be the same black (dark) color because the scanner incorporated in the copying machine does not measure the infrared light reflection characteristics. Accordingly, in the duplicate made by the copying machine, all the dark-color modules 2*b* are printed in black using the same ink.

Generally used copying machines include those which print black color using an infrared light transmissive ink (dye ink usually), and those which print black color using an infrared light absorptive ink (pigment ink usually). The optical code that has been duplicated using whichever of these types of copying machines loses the infrared light reflective dark-color modules 2*ba* and the infrared light absorptive dark-color modules 2*bb* provided to the optical code 1 that is the original. Thus, when infrared light is applied to the optical code 1 of the present embodiment, the read module pattern is different from one read by applying visible light. Since the pattern read in infrared light is difficult to duplicate by a copying machine, infrared light reflection characteristics are measured to determine whether an authentic product identifier code is provided. Consequently, the optical code 1 as the original is discriminated from a duplicate.

The following description addresses a specific method of using the optical code 1 of the present embodiment.

The optical code 1 of the present embodiment is printed on medication packaging boxes. The optical code 1 includes product information which is based on the light- and dark-color modules 2a and 2b, and used for product management. The product information includes a manufacturer ID, a product identifier code, expiration date, lot number, and serial number. The product information is in conformity with the GS1 identifier code standards. Also, the information included in the product information is not limited to the above items, but may be changed as appropriate.

Generally, medications are distributed in the order of manufacturers to wholesalers and to medical institutions, or pharmacies to consumers. A medication with the optical code 1 printed on its packaging box is subjected to product management through reading of the product information recorded on the optical code 1, at the time of shipment from the manufacturer, at the time of reception and shipment by the wholesaler, at the time of reception at the medical institution or the pharmacy, at the time of selling to a consumer, and the like. The product information, which is recorded with a pattern of the light- and dark-color modules 2a and 2b, is readable by generally used QR code reading devices. Thus, for the optical code 1 of the present embodiment, basic product management can be conducted by using moderately priced reading devices.

Distribution of inauthentic products (counterfeit products) of medications is a serious problem, and therefore mixing of inauthentic products during distribution of products is required to be prevented. A medication with the optical code 1 printed on its packaging box enables verification of the product by determining whether the optical code 1 on the packaging box is a duplicate, based on the presence of an authentic product identifier pattern.

The optical code 1 of the present embodiment is used for recording product information for use in product management. Accordingly, when the product information is read concurrently with authenticating the optical code 1, based on the presence of an authentic product identifier pattern, the task of verifying product can be concurrently performed with the task of verifying product information. For example, use of a dedicated reading device, which will be described below, enables both the task of reading product information and the task of verifying product, concurrently.

The following description addresses a dedicated reading device which enables the task of reading product information concurrently with the task of verifying product.

Figure 10:
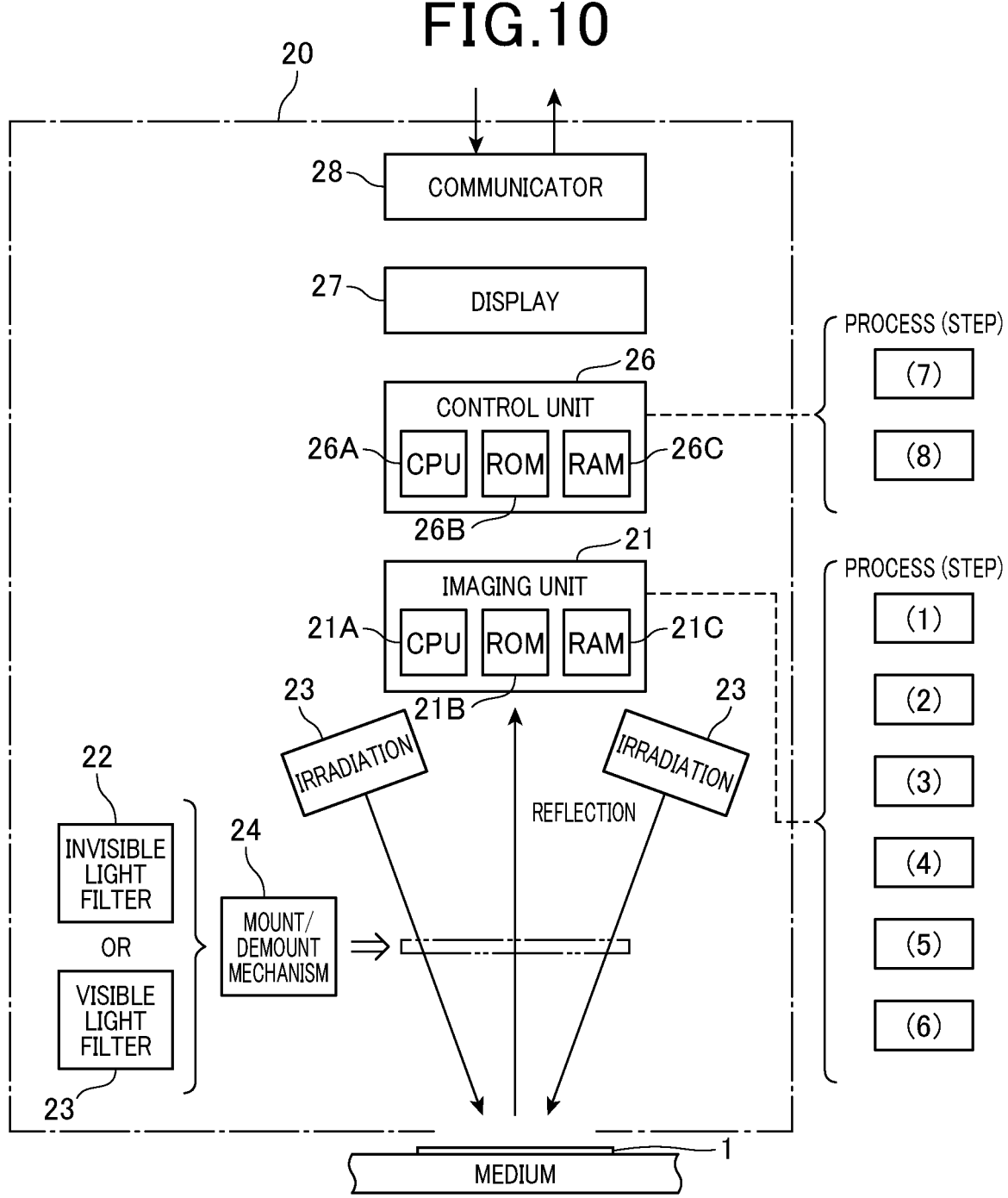
FIG. 10 is a schematic block diagram illustrating a configuration of a dedicated reading device for the optical code according to the first embodiment, together with functional processing (steps) performed by a control unit and an imaging unit of the reading device.

As shown in FIG. 10, this dedicated reading device 20 includes an imaging unit 21, an infrared light filter 22, a visible light filter 23, a mount/demount mechanism 24, an irradiation unit 25, a control unit 26, a display unit 27, and a communication unit 28. The imaging unit 21 includes an imaging device that can detect visible light and infrared light. The infrared light filter 22 shields visible light and transmits infrared light as invisible light. The visible light filter shields infrared light and transmits visible light. The mount/demount mechanism 24 selectively mounts/demounts the infrared light filter 24 and the visible light filter 23 to/from a light path. The irradiation unit 25 emits infrared light and visible light. The control unit 26 controls imaging and data processing. The display unit 27 displays various pieces of information. The communication unit 28 outputs data externally.

The imaging unit 21 captures an image of an optical code, which is formed by reflection of the light applied to the optical code by an irradiation unit. The imaging unit 21 includes a visible light recorded data reader (functionally configured by step (1) described later) and an invisible light recorded data reader (functionally configured by step (2) described later). The visible light recorded data reader is capable of reading information, based on a module pattern obtained from a captured image that is formed by reflection of visible light. The invisible light recorded data reader is capable of reading information, based on a module pattern obtained from a captured image that is formed by reflection of infrared light. The control unit 26 includes an authentication unit (functionally configured by step (2) described later) that authenticates the optical code 1, based on the information read by the visible light recorded data reader and the information read by the invisible light recorded data reader.

The imaging unit 21 and the control unit 26 each have a configuration as a computer (processor) including, for example, ROM (read only memory) 21B (26B) and RAM (random access memory) 21C (26C), in addition to CPU (central processing unit) 21A (26A) performing arithmetic processing. The ROM is a recording medium that serves as a non-transient computer readable recording medium and stores in advance programs for reading or processing data needed by the ROM. The CPU, when started, reads a necessary program from the ROM into a work area of the CPU to command reading according to the procedure described in the program, or to process data. As a matter of course, data can be stored in the ROM.

The RAM is used as a temporary memory area for the data used in the processing performed by the CPU. The CPUs of the imaging unit and the control unit each functionally implement the processes (the functional processing unit mentioned above) or the steps assigned by a program. As a matter of course, the imaging unit and the control unit may be integrated with each other and designed as a single computer system.

The dedicated reading device 20 sequentially executes the task of reading product information and the task of verifying product, according to the following procedure. Specifically, as shown in FIG. 10, the following processes (1) to (6) are performed by the imaging unit 21 (i.e. CPU 21A). Further, the following processes (7) and (8) are performed by the control unit 26 (i.e. CPU 26A).

(1) Visible Light Imaging Process (Step)

A visible light image of the optical code 1 on a support (medium) that holds the code is captured. Specifically, an image of the optical code 1 is captured in a state in which the infrared light filter is demounted from the light path and the visible light filter is mounted to the light path. As necessary, the optical code 1 is irradiated with visible light emitted from the irradiation unit. This process (step) configures a visible light image capturing unit.

(2) Infrared Light Imaging Process (Step)

An infrared light image of the optical code 1 is captured. Specifically, an image of the optical code 1 is captured in a state in which the visible light filter is demounted from the light path and the infrared light filter is mounted to the light path. As necessary, the optical code 1 is irradiated with infrared light emitted from the irradiation unit. This process (step) corresponds to invisible light imaging process (or a unit therefor) or an invisible light recorded data reader.

(3) Visible Light Reflection Characteristics Discriminating Process (Step)

Based on the image captured in the visible light imaging process, each of the modules 2 configuring the optical code 1 is specified to discriminate whether the module 2 is a light-color module 2a or a dark-color module 2b. This step can be achieved by using a well-known QR code reading method. This process (step) corresponds to invisible light recorded data reading processing (unit).

(4) Product Information Reading Process (Step)

The product information recorded on a pattern of the light- and dark-color modules 2a and 2b in the encoded region 4 is read. This step can be achieved by using a well-known QR code reading method.

(5) Infrared Light Reflection Characteristics Discriminating to Process (Step)

Based on the image captured in the infrared light imaging process, each of the modules 2 configuring the optical code 1 is specified to discriminate whether the module 2 is a high infrared reflectance module (the light-color module 2a and the infrared light reflective dark-color module 2ba) or has a low infrared reflectance module (the infrared light absorptive dark-color module 2bb). Then, the result of the discrimination is combined with the result of the discrimination of the visible light reflection characteristics discriminating process to thereby discriminate whether each of the modules 2 of the optical code 1 is the light-color module 2a, or the infrared light reflective dark-color module 2ba, or the infrared light absorptive dark-color module 2bb. Based on the infrared light image, the position specification of each module 2 is attempted several times. If the position is not specified, the process directly proceeds to the subsequent authenticating process. In the infrared light reflection characteristics discriminating process, the position of each module 2 in the infrared light image is specified based on the functional patterns 3 included in the image. The position can be specified because the infrared light image includes the functional patterns 3 that are sufficient to enable specification of each module 2, although the upper-left position detection pattern 5 may be incomplete.

(6) Authenticating Process (Step)

Based on the results of the infrared light reflection characteristics process, it is determined whether there is an authentic product identifier pattern in the upper-left position detection pattern 5. If the authentic product identifier pattern is determined to be present, the product in the packaging box to which the optical code is affixed is determined to be an authentic product. If the authentic product identifier pattern is determined not to be present, the product in the packaging box to which the optical code is affixed is determined to be an inauthentic product. The product in the packaging box to which the optical code is affixed is also determined to be an inauthentic product if the position of a module 2 has not been specified in the infrared light reflection characteristics discriminating process, even when the product information reading has been successful in the product information reading process. This process (step) configures the authentication unit (step).

(7) And (8) Results Output Process (Step)

The product information read in the product information reading process and the result of the determination made in the authenticating process are displayed on the display unit (step 7) and outputted to the outside via the communication unit (step 8).

As described above, generally used QR code reading devices can be used for reading the product information recorded on the optical code 1 of the present embodiment affixed to a packaging box of a medicament. Accordingly, the product information recorded on the optical code 1 can be read in each stage of distribution at low cost to thereby manage commodity products. In reading the optical code 1 of the present embodiment, it is determined whether an authentic product identifier code is present at a predetermined position by measuring the reflectance of each module 2 to thereby detect a duplicate of the optical code 1. Accordingly, inauthentic products using a packaging box with affixation of a duplicate of the optical code 1 are appropriately prevented from being distributed.

Product information is required to be read in each stage of distribution from substantially all the products. However, the task of verifying product is not necessarily performed in all the stages of the distribution, but may be performed in an unannounced or random inspection with respect to part of products. This way of verification exerts an effect that is satisfactory to some extent. Thus, the task of verifying product only has to be performed less frequently than the task of reading product information. In this way, determining a duplicate of the optical code 1 of the present embodiment involves use of a dedicated reading device that can measure infrared reflectance, but can be performed less frequently at low cost.

The optical code 1 of the present embodiment includes product information recorded and used for product management. Further, when performing commodity product management in the medication distribution, the product information recorded in the visible light recording area is read concurrently with verifying the authentic product identifier code recorded on the optical code 1. Accordingly, the optical code 1 of the present embodiment has an advantage of simplifying the task of verifying product.

The optical code 1 of the present embodiment enables discrimination between an original optical code 1 and a duplicate by only determining whether an authentic product identifier pattern is formed by the infrared light reflective dark-color module 2ba and the infrared light absorptive dark-color module 2bb in the upper-left position detection pattern 5. Accordingly, the optical code 1 has an advantage of easily detecting duplicates.

In the present embodiment, the position of each module 2 in the infrared light image is specified in the infrared light reflection characteristics discriminating process, based on an incomplete functional pattern 3 included in the image. However, in an image captured in the visible light imaging process, the position of each module 2 can be specified based on a complete functional pattern.

Thus, the position of each module 2 in an image captured in the infrared light imaging process may be specified by aligning the image with an image captured in the visible light imaging process.

Second Embodiment

In the present embodiment, part of the components of the first embodiment has been changed. Therefore, description on the components common to the first embodiment is omitted, with these components being assigned with the same reference signs.

Figure 4:
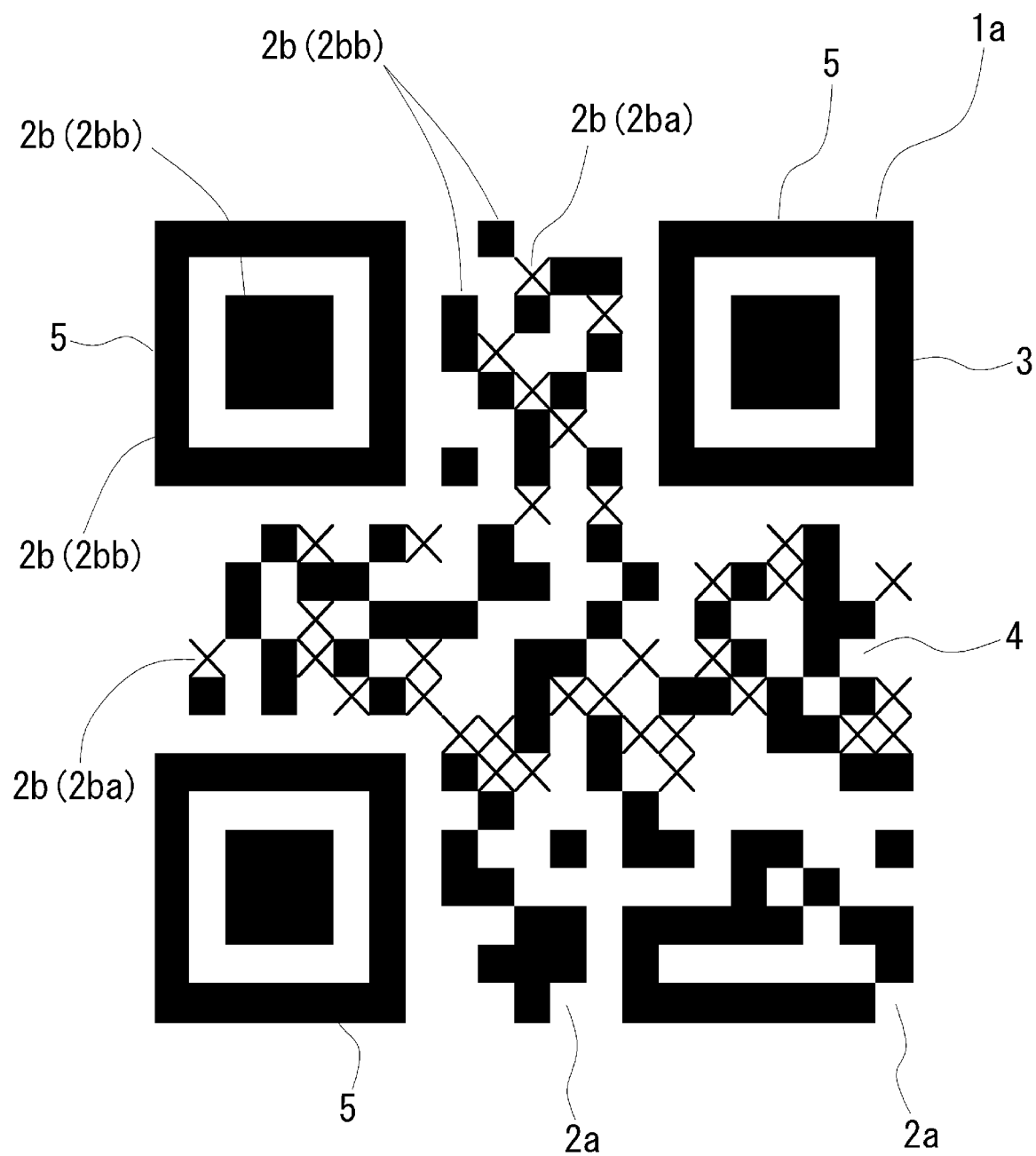
FIG. 4 is a diagram illustrating an optical code 1a according to a second embodiment, in which an infrared light reflective dark-color module 2ba is discriminated from an infrared light absorptive dark-color module 2bb.

As in the first embodiment, an optical code 1a of the present embodiment has dark-color modules 2b configured by infrared light reflective dark-color modules 2ba and infrared light absorptive dark-color modules 2bb. In FIG. 4, the modules filled with a white color are light-color modules 21, the modules marked with X are infrared light reflective dark-color modules 2ba, and the modules filled with a black color are infrared light absorptive dark-color modules 2*bb*. In the present embodiment, dark-color modules 2*b* configuring the functional pattern 3 are all configured by the infrared light absorptive dark-color modules 2*bb*. Furthermore, the dark-color modules 2*b* in the encoded region 4 are configured by the infrared light reflective dark-color modules 2*ba* and the infrared light absorptive dark-color modules 2*bb*.

The optical code 1*a* of the present embodiment is provided with two kinds of data recording areas. One is an invisible light recording area in which data is recorded using a pattern of the light-color modules 2*a* and the dark-color modules 2*b* in the encoded region 4, as in the first embodiment. The other is an infrared light recording area in which data is recorded using a pattern of the infrared light reflective dark-color modules 2*ba* and the infrared light absorptive dark-color modules 2*bb* in the encoded region 4.

As in the first embodiment, the visible light recording area is used for recording product information (manufacturer ID, product identifier code, expiration date, lot number, and serial number). The product information recorded in the visible light recording area, as in the first embodiment, is recorded based on QR code standards, and thus is readable by generally used QR code reading devices. In this way, the visible light recording area can be read by generally used QR code reading devices and thus has characteristics of a publicly opened area from which recorded information is readily readable.

The infrared light recording area is used for recording an authentic product identifier code that indicates the product being authentic. Specifically, the infrared light recording area is used for recording binary data which is obtained by encoding an authentic product identifier code with ASCII code, encrypting the encoded code, and then further imparting an error correction code to the encrypted code. The binary data is recorded with a pattern of the infrared light reflective dark-color modules 2*ba* and the infrared light absorptive to dark-color modules 2*bb* in the encoded region 4. Accordingly, the authentic product identifier code recorded in the infrared light recording area can be measured for infrared reflectance, and can be read only by a dedicated reading device in which a decryption key is recorded to decrypt the encrypted authentic product identifier code. In this way, the infrared light recording area has characteristics of a secret area where recorded information is readable only by specially designed reading devices.

In this way, data is recorded on the optical code 1*a* of the present embodiment with a pattern of the infrared light reflective dark-color modules 2*ba* and the infrared light absorptive dark-color modules 2*bb*. This configuration provides an advantage of recording high secrecy data which is difficult to be read by generally used QR code reading devices, besides the data recorded with a pattern of the light- and dark-color modules 2*a* and 2*b*.

As in the first embodiment, product information is recorded on the optical code 1*a* of the present embodiment with a pattern of the light- and dark-color modules 2*a* and 2*b*. Therefore, a medicament in a packaging box with affixation of the optical code 1*a* can be subjected to commodity product management by using generally used QR code reading devices for reading the product information.

As described above, the authentic product identifier code recorded on the infrared light recording area can be read by using a dedicated reading device. If the optical code 1*a* of the present embodiment is duplicated by use of a copying machine, the pattern of the infrared light reflective dark color modules 2*ba* and the infrared light absorptive dark color modules 2*bb* is lost from the duplicate, and accordingly the data recorded in the infrared light recording area is lost. Therefore, the optical code 1*a* of the present embodiment is determined as to the presence of the record of the authentic product identifier code made up of the infrared light reflective dark-color modules 2*ba* and the infrared light absorptive dark-color modules to 2*bb*. Based on this determination, the optical code affixed to the packaging box can be determined as to whether it is the authentic optical code 1*a*. Thus, the optical code 1*a* of the present embodiment can also be used for verifying products.

The optical code 1*a* of the present embodiment can be prepared, for example, using a method including the following steps.

(1) Preparation of Data to be Recorded

Data (product information) to be recorded in the visible light recording area is prepared.

(2) Preparation of Data Based on QR Code

A QR code is prepared to record product information prepared in step (1). Specifically, a pattern of the light- and dark-color modules 2*a* and 2*b* in the optical code 1*a* is decided. Since this step can be realized according to well-known QR code preparing methods, detailed description is omitted.

(3) Preparation of Data to be Recorded in the Infrared Light Recording Area

Data (authentic product identifier code) to be recorded in the infrared light recording area is prepared. Specifically, an authentic product identifier code is encoded, encrypted, and imparted with an error correction code.

(4) Designation of Infrared Light Reflective Dark-Color Modules and Infrared Light Absorptive Dark-Color Modules For each dark-color module 2*b* decided in step (2), it is decided whether the dark-color module 2*b* is used as an infrared light reflective dark-color module 2*ba* or an infrared light absorptive dark-color module 2*bb*. Specifically, 1 bit of the binary data of the data (authentic product identifier code) prepared in step (3) is recorded in one dark-color module 2*b* of the encoded region 4. If the bit to be recorded indicates 1, the dark-color module 2*b* in question is designated as an infrared light reflective dark-color module 2*ba*, and if the bit to be recorded indicates 0, the dark-color module 2*b* in question is designated as an infrared light absorptive dark-color module 2*bb*. In this step, all the patterns of the modules 2 are decided. Which one of the dark-color modules 2*b* in the encoded region 4 should be used for recording each bit of the binary data is decided as appropriate. For example, the dark-color modules 2*b* in the encoded region 4 may be ranked from the left-end one on the topmost row, and the binary data may be sequentially recorded bit by bit from the highest-order dark-color module 2*b*. Alternatively, by performing interleaving, the binary data may be recorded every fixed number of dark-color modules 2*b*.

(5) Printing

As in the first embodiment, the optical code 1*a* is printed onto the paper base material 10 configuring a packaging box, using the black inks 11*a* and 11*b*.

As in the first embodiment, the optical code 1*a* of the present embodiment is capable of reading product information concurrently with verifying the product based on the presence of an authentic product identifier code to omit the time and labor involved in the task of verifying product. The following description addresses a dedicated reading device capable of implementing the task of reading product information concurrently with the task of verifying product.

The dedicated reading device has the same hardware configuration as the dedicated reading device described in the first embodiment. The dedicated reading device carries out the task of reading product information concurrently with the task of verifying product through the following procedure. The following processes (1) to (5) are the same as those described in the first embodiment and therefore only the process names are listed and description is omitted.

(1) Visible Light Imaging Process
(2) Infrared Light Imaging Process
(3) Visible Light Reflection Characteristics Discriminating Process
(4) Product Information Reading Process
(5) Infrared Light Reflection Characteristics Discriminating Process
(6) Infrared Light Recording Area Reading Process This process is performed for reading data recorded in the pattern of the infrared light reflective dark-color modules $2ba$ and the infrared light absorptive dark-color modules $2bb$ in the encoded region 4. Specifically, detection/correction is performed using an error correction code, and the encrypted data is decrypted.

(7) Authenticating Process

The data recorded in the infrared light recording area is checked against the authentic product identifier code recorded in advance in the dedicated reading device. If the data agrees with the authentic product identifier code, an authentic product determination is made for the product in the packaging box to which the optical code is affixed. If the data recorded in the infrared light recording area does not agree with the authentic product identifier code, or if the data recorded in the infrared light recording area cannot be read, or if the finding of the module 2 configuring the optical code 1 is unsuccessful in the infrared light reflection characteristics discriminating process, although the product information has been successfully read in the product information reading process, an inauthentic product determination is made for the product in the packaging box to which the optical code is affixed.

(8) Result Outputting Process

The product information read in the product information reading process and the results of the determination made in the authenticating process are displayed on the display unit, and at the same time, externally outputted through the communication unit.

As described above, similarly to the optical code 1 of the first embodiment, the optical code $1a$ of the present embodiment enables reading of the product information using generally used reading devices for capturing an image in visible light. Therefore, the optical code $1a$ minimizes the cost incurred in commodity product management and prevents the optical code from being abused by making duplicates.

Furthermore, for the optical code $1a$ of the present embodiment, authentication is carried out based on whether an authentic product identifier code is recorded in the infrared light recording area thereof. This way of authentication enables detection of not only the duplicates of the optical code $1a$ but also the counterfeit optical codes falsifying the product information. To falsify the product information, the positions of the light- and dark-color modules $2a$ and $2b$ have to be altered. However, the counterfeit optical codes with altered positions of the light- and dark-color modules $2a$ and $2b$ lose the authentic product identifier code recorded in the dark-color modules $2b$. This is why duplicated or counterfeit optical codes can be detected. Thus, the configuration of the present embodiment appropriately enables control over distribution of counterfeit optical codes in which the data of the optical code $1a$ is falsified.

The optical code $1a$ of the present embodiment includes the functional pattern 3 in which all the dark-color modules $2b$ are infrared light absorptive dark-color modules $2bb$. Therefore, in an image of the optical code $1a$ captured in infrared light, the functional pattern 3 formed by the light- and dark-color modules $2a$ and $2b$ is captured as it is. Thus, the present embodiment has an advantage of enabling easy specification of the positions of the modules 2, based on the functional pattern 3 included in an image of the optical code $1a$ captured in infrared light.

In the authenticating process of the present embodiment, the optical code 1 is determined to be authentic if an authentic product identifier code is recorded in the infrared light recording area. As an alternative to this, the optical code may be determined to be authentic if the dark-color modules $2b$ in the encoded region 4 are configured by two kinds of modules, i.e. the infrared light reflective dark-color modules tab and the infrared light absorptive dark-color modules $2bb$.

In the present embodiment, only an authentic product identifier code is recorded in the infrared light recording area, for use in authentication. However, other information may also be recorded in the infrared light recording area.

Third Embodiment

In the present embodiment, part of the components of the second embodiment has been changed. Therefore, description on the components common to the second embodiment is omitted.

The optical code of the present embodiment is characterized in that a serial code of the product is recorded in the infrared light recording area, instead of the authentic product identifier code. The serial code of the product is also included in the product information in the visible light recording area. Therefore, the optical code of the present embodiment includes the serial code of the product recorded in both the visible light recording area and the infrared light recording area.

In the optical code of the present embodiment, the serial code recorded in the visible light recording area is checked against the serial code recorded in the infrared light recording area. If these serial codes agree with each other, the optical code is determined to be authentic. As in the second embodiment, a pattern of the infrared light reflective dark-color modules $2ba$ and the infrared light absorptive dark-color modules $2bb$ is lost in a duplicate of the optical code of the present embodiment obtained by duplicating the optical code using a copying machine and accordingly the data recorded in the infrared light recording area is lost. This is why the optical code can be determined to be authentic.

In the optical code of the present embodiment, when compared to the second embodiment, the data in the visible light recording area is checked against the data in the infrared light recording area to determine authenticity of the optical code. Accordingly, the optical code of the present embodiment has an advantage of omitting recording of data used for checking (the authentic product identifier code of the second embodiment), into a device that carries out authentication. Furthermore, the data recorded in the infrared light recording area is intimately correlated with the product information recorded in the visible light recording area. Accordingly, counterfeit optical codes are more difficult to prepare by falsifying the product information.

Fourth Embodiment

In the present embodiment, part of the components of the second embodiment has been changed. Therefore, in the drawings, the components common to the second embodiment are designated with like reference signs to omit duplicate description.

Figure 5:
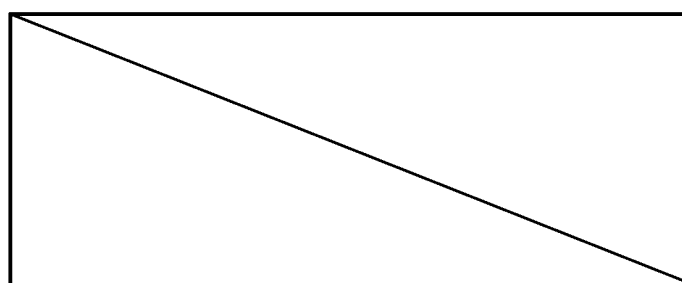
FIG. 5 is a table showing characteristics of modules according to a fourth embodiment.

As in the second embodiment (see FIG. 4), an optical code 1b of the present embodiment includes the dark-color modules 2b configuring an encoded region 4. The dark-color modules 2b include the infrared light reflective dark-color modules 2ba and the infrared light absorptive dark-color modules 2bb. As shown in FIG. 5, the infrared light reflective dark-color modules 2ba of the present embodiment include first infrared light reflective dark-color modules 2baa and second infrared light reflective dark-color modules 2bab.

Figure 6:
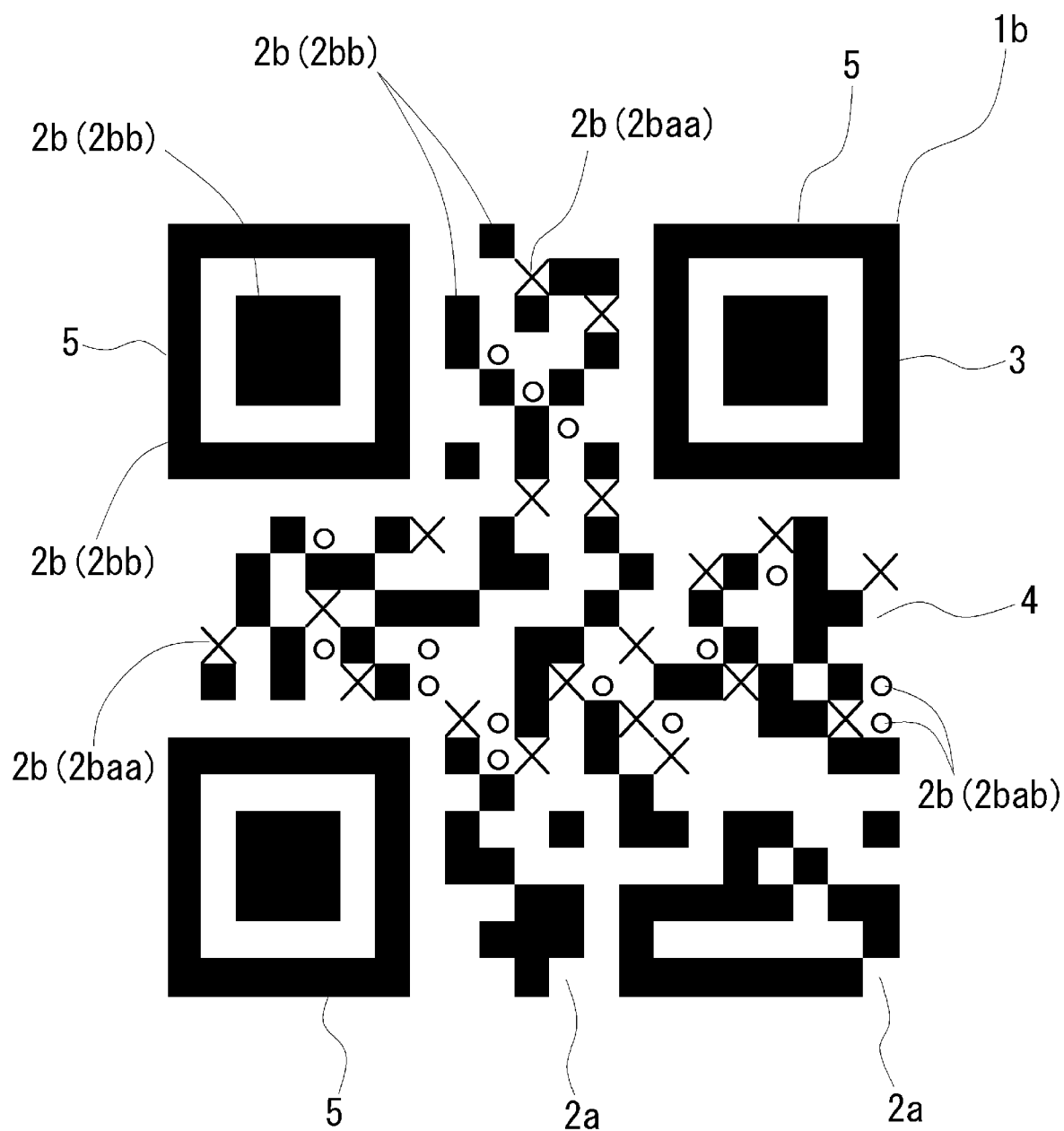
FIG. 6 is a diagram illustrating an optical code 1b according to the fourth embodiment, in which a first infrared light reflective dark-color module 2ba, a second infrared light reflective dark-color module 2bab, and an infrared light absorptive dark-color modules 2bb are discriminated from one another.

The first infrared light reflective dark-color modules 2baa have low reflectance for visible light and infrared light of 880 nm, and have high reflectance for infrared light of 1,000 nm. The second infrared light reflective dark-color modules 2bab have low reflectance for visible light and infrared light of 880 nm, and have high reflectance for infrared light of 1,000 nm. In FIG. 6, white modules are light-color modules 2a, the modules marked with X are the first infrared light reflective dark-color modules 2baa, the modules marked with 0 are the second infrared light reflective dark-color modules 2bab, and black modules are infrared light absorptive dark-color modules 2bb.

The optical code 1b of the present embodiment is provided with two kinds of data recording areas. One is an invisible light recording area in which data is recorded using a pattern of the light-color modules 2a and the dark-color modules 2b in the encoded region 4. The other is an infrared light recording area in which data is recorded using a pattern of the first infrared light reflective dark-color modules 2baa, and the infrared light absorptive dark color modules 2bb in the encoded region 4.

As in the second embodiment, the visible light recording area is used for recording product information (manufacturer ID, product identifier code, expiration date, lot number, and serial number). The product information recorded in the visible light recording area, as in the second embodiment, is recorded based on QR code standards, and thus is readable by generally used QR code reading devices.

The infrared recording area is used for recording an authentic product identifier code, which is the same as in the second embodiment. In the present embodiment, an authentic product identifier code is encoded using the ASCII code, followed by encryption, and then given an error correction code to thereby prepare binary data, which is converted to a ternary number. The ternary number data is recorded in a pattern of the first infrared light reflective dark-color modules 2baa, the second infrared light reflective dark-color modules 2bab, and the infrared light absorptive dark-color modules 2bb in the encoded region 4.

Therefore, the authentic product identifier code recorded in the infrared light recording area of the present embodiment enables individually measuring the reflectance for 880 nm and 1,000 nm infrared light and enables reading only by dedicated reading devices in which a decryption key is recorded to decrypt the encrypted authentic product identifier code. In this way, the infrared recording area has characteristics as a secret area from which the recorded information is readable only by specially designed reading devices.

The optical code 1b of the present embodiment is prepared by forming layers of three kinds of black inks on a surface of a white paper base material 10 structuring a packaging box. Specifically, portions exposed to the surface of the paper base material 10 with no black ink printed are used as the light-color modules 2a having high visible light reflectance, and portions where the black ink layers are formed are used as the dark-color modules 2b having low visible light reflectance. The three kinds of black inks include a first infrared light transmissive black ink that absorbs 880 nm infrared light but transmits 1,000 nm infrared light, a second infrared light transmissive black ink that transmits both 880 nm infrared light and 1,000 nm infrared light, and an infrared light absorptive black ink that absorbs both 880 nm infrared light and 1,000 nm infrared light.

Specifically, the portions provided with a layer of the first infrared light transmissive black ink allow transmission of only 1,000 nm infrared light for reflection at the paper base material to serve as the first infrared light reflective dark-color modules 2baa. The portions provided with a layer of the second infrared light transmissive black ink allow transmission of both 880 nm infrared light and 1,000 nm infrared light for reflection at the paper base material to serve as the second infrared light reflective dark-color modules 2bab. The portions provided with a layer of the infrared light absorptive black ink allow absorption of both 880 nm infrared light and 1,000 nm infrared light to serve as the infrared light absorptive dark-color modules 2bb.

Since the optical code 1b of the present embodiment is prepared using three kinds of inks with different transmission characteristics for infrared light, counterfeiting of the optical code 1b with the same structure is more difficult than the optical code of the second embodiment. Thus, with a medication being packed in a packaging box to which the optical code 1b of the present embodiment is affixed, inauthentic products of the medication are prevented from being distributed.

Fifth Embodiment

In the present embodiment, part of the components of the second embodiment has been changed. Therefore, in the drawings, the components common to the second embodiment are designated with like reference signs to omit duplicate description.

Figure 7:
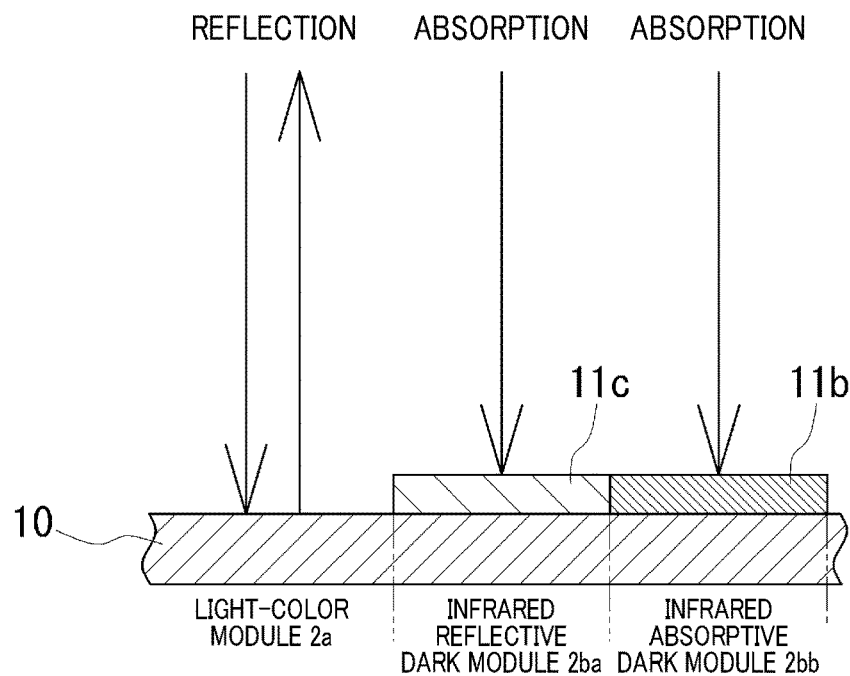
FIG. 7 is a set of diagrams illustrating characteristics of modules of an optical code according to a fifth embodiment.
Figure 7:
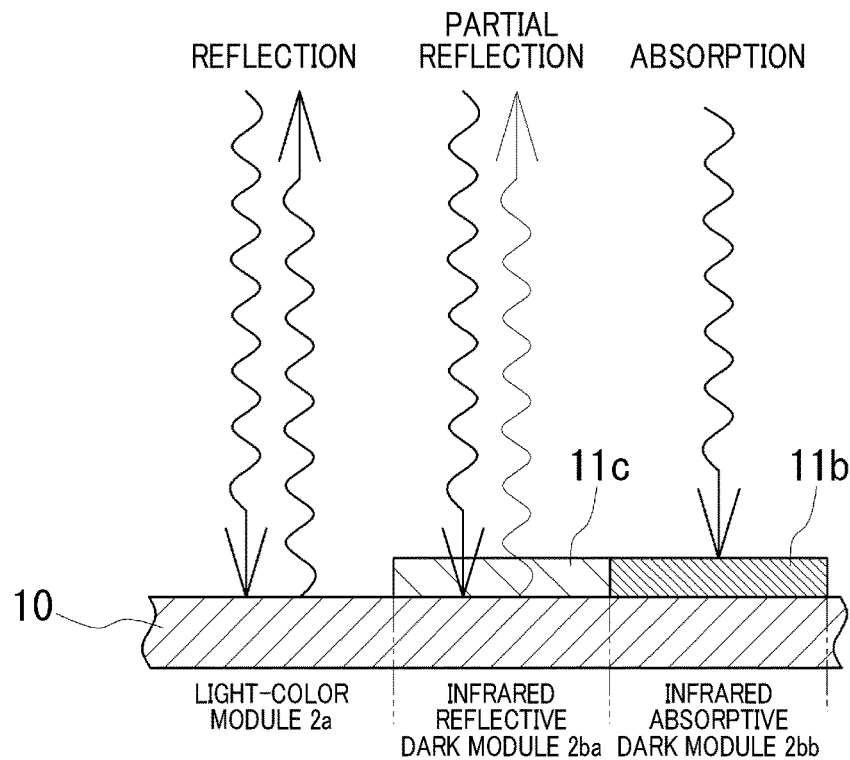

The present embodiment is characterized in that the infrared reflectance of the infrared light reflective dark-color modules 2ba is made lower than in the second embodiment. Specifically, the infrared light reflective dark-color modules 2ba of the present embodiment are not formed of the infrared light transmissive black ink 11a alone, but formed of an infrared light semi-transmissive black ink 11c obtained by mixing the infrared light transmissive black ink 11a with a small amount of the infrared light absorptive black ink 11b. A layer made of the infrared light semi-transmissive black ink 11c does not allow full transmission of infrared light but allows partial transmission of infrared light with a part being absorbed into the layer. Therefore, as shown in FIG. 7, the infrared reflectance of the infrared light reflective dark-color modules 2ba of the present embodiment is about 50%. The infrared light reflective dark-color modules 2ba, when seen in visible light, are black and have visible light reflection characteristics equivalent to those of the infrared light absorptive dark-color modules 2bb.

The infrared reflectance in the optical code of the present embodiment is high (75% or more) in the light-color module 2a, about 50% in the infrared light reflective dark-color module 2ba, and low (25% or less) in the infrared light absorptive dark-color module 2bb. Thus, the infrared reflectance is different, in the present embodiment, between the light-color module 2a, the infrared light reflective dark-color module 2ba and the infrared light absorptive dark-color module 2bb. Therefore, only the measurement of infrared reflectance with a dedicated reading device enables discrimination between the light-color module 2a, the infrared light reflective dark-color module 2ba, and the infrared light absorptive dark-color module 2bb.

As in the second embodiment, the optical code of the present embodiment includes an infrared light recording area used for recording data with a pattern of the infrared light reflective dark-color modules 2ba and the infrared light absorptive dark-color modules 2bb in the encoded region 4, so that an authentic product identifier code is recorded in the infrared light recording area. As in the second embodiment, if the optical code of the present embodiment is to duplicated by a copying machine, the pattern of the infrared light reflective dark-color modules 2ba and the infrared light absorptive dark-color modules 2bb is lost in the duplicate and accordingly the data recorded in the infrared light recording area is lost. Thus, using a dedicated reading device, the optical code 1 of the present embodiment is determined as to whether an authentic product identifier code is recorded thereon with a pattern of the infrared light reflective dark-color modules 2ba and the infrared light absorptive dark-color modules 2bb. Accordingly, the optical code affixed to the packaging box is determined as to whether it is an authentic one. In this way, the optical code of the present embodiment can also be used for verifying an authentic product.

The optical code of the present embodiment can be prepared using a method similar to that used for the optical code 1a of the second embodiment, except for the use of the infrared light semi-transmissive black ink 11c, instead of the infrared light transmissive black ink 11a, for printing the infrared light reflective dark-color modules 2ba. Alternative to the printing using the infrared light semi-transmissive black ink 11c, the infrared light reflective dark-color modules 2ba of the present embodiment may be formed by printing the infrared light transmissive black ink 11a and then by printing a small amount of infrared light absorptive black ink 11b over the infrared light transmissive black ink 11a.

A method easier than in the second embodiment is available to the optical code of the present embodiment. Using this method, product information can be read concurrently with verifying an authentic product based on the presence of an authentic product identifier pattern. The following description addresses a dedicated reading device that can implement the task of reading product information concurrently with the task of verifying authentic product.

The dedicated reading device has the same hardware configuration as that of the dedicated reading device described in the first embodiment. The dedicated reading device concurrently carries out the task of reading product information and the task of verifying to authentic product. Description of processes similar to those in the authenticating process described in the first and second embodiments is omitted.

(1) Infrared Light Imaging Process

This process is similar to the infrared light imaging process of the first embodiment.

(2) Threshold Setting Process

A frequency distribution of infrared intensity is prepared for a plurality of pixels included in an image captured in the infrared light imaging process to determine thresholds of the pixels having comparatively high infrared reflectance, the pixels having intermediate infrared reflectance, and the pixels having comparatively low infrared reflectance. Specifically, the optical code of the present embodiment is made up of three kinds of modules, i.e. the light-color modules 2a having high infrared reflectance, the infrared light reflective dark-color modules 2ba having intermediate infrared reflectance, and the infrared light absorptive dark-color modules 2bb having low infrared reflectance. Therefore, there are three peaks in the frequency distribution of infrared intensity. In the threshold process, the troughs between the three peaks are set as thresholds.

(3) Infrared Reflection Characteristics Discriminating Process

Using the thresholds set in the threshold setting process as criteria and based on the image captured in the infrared light imaging process, the positions of the modules 2 configuring the optical code are specified. Then, it is identified whether each module 2 is a light-color module 2a having high infrared reflectance, or an infrared light reflective dark-color module 2ba having intermediate infrared reflectance, or an infrared light absorptive dark-color module 2bb having low infrared reflectance.

(4) Product Information Reading Process

This process is similar to the product information reading process of the first embodiment.

(5) Infrared Light Recording Area Reading Process

This process is similar to the infrared light recording area reading process of the second embodiment.

(6) Authenticating Process

This process is similar to the authenticating process of the second embodiment.

(7) Result Outputting Process

This process is similar to the result outputting process of the second embodiment.

As described above, the optical code of the present embodiment enables identification between a light-color module 2a, an infrared light reflective dark-color module 2ba, and an infrared light absorptive dark-color module 2bb based on only an image captured in infrared light. Thus, the tasks of reading product information and verifying authentic product can be simplified.

Sixth Embodiment

The present embodiment is a reading assist device that enables a smartphone (cellular phone) to read the data recorded in the infrared light recording area of the optical code 1a of the second embodiment.

In general, an imaging device of the camera in smartphones has sensitivity not only to a visible light region but also to an infrared light region. Accordingly, when an image is captured by the camera of a smartphone in only reflected infrared light, with reflected visible light being shielded, the infrared light can discriminate between high and low reflectance in the image, for each of the modules 2 of the optical code 1a. The reading assist device of the present embodiment enables a smartphone to capture an image under such conditions and allows the smartphone to serve as a reading device for reading data recorded in the infrared light recording area of the optical code 1a.

Figure 8:
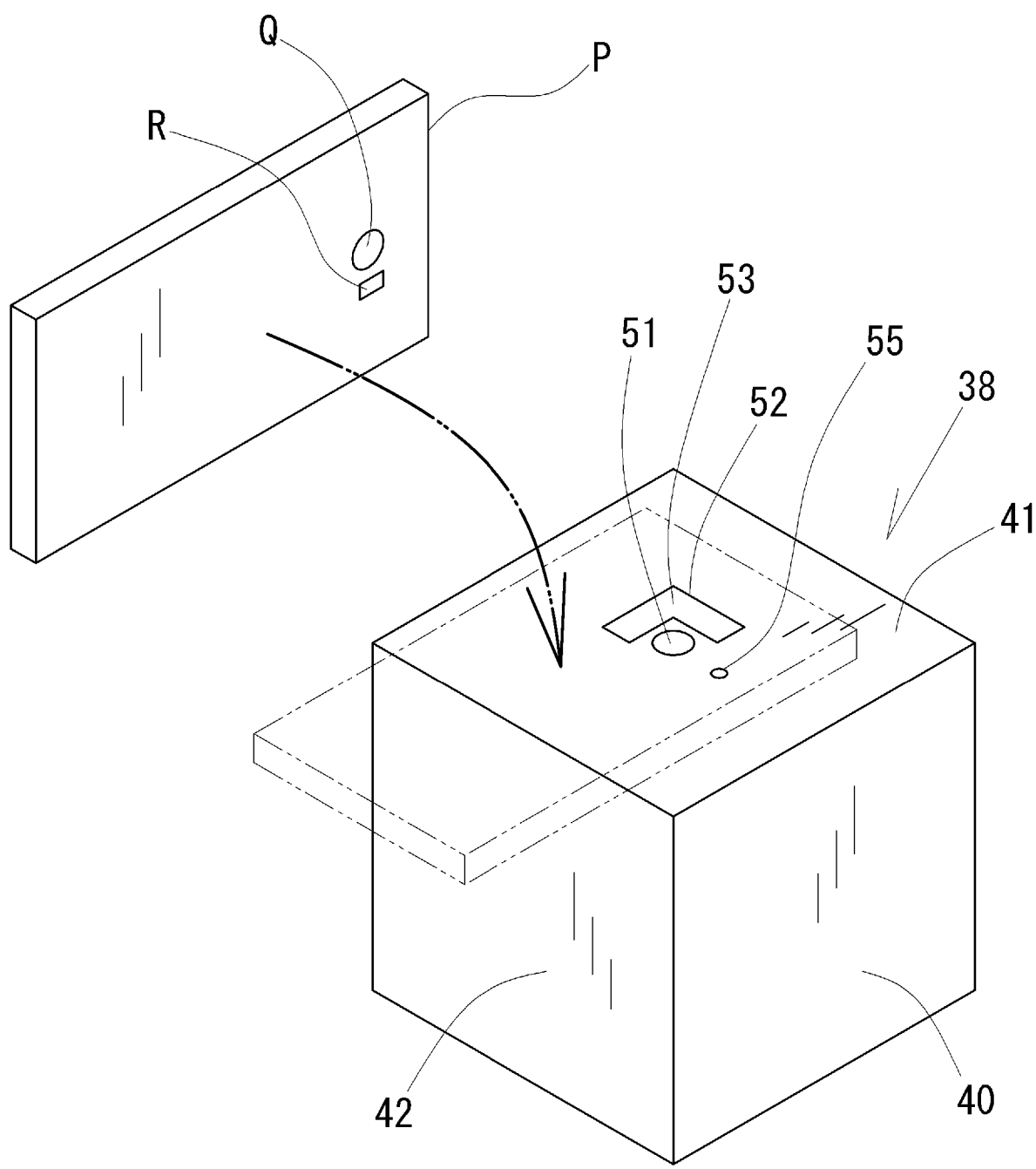
FIG. 8 is a perspective view illustrating a reading assist device 39 according to a sixth embodiment and a smartphone P.
Figure 9:
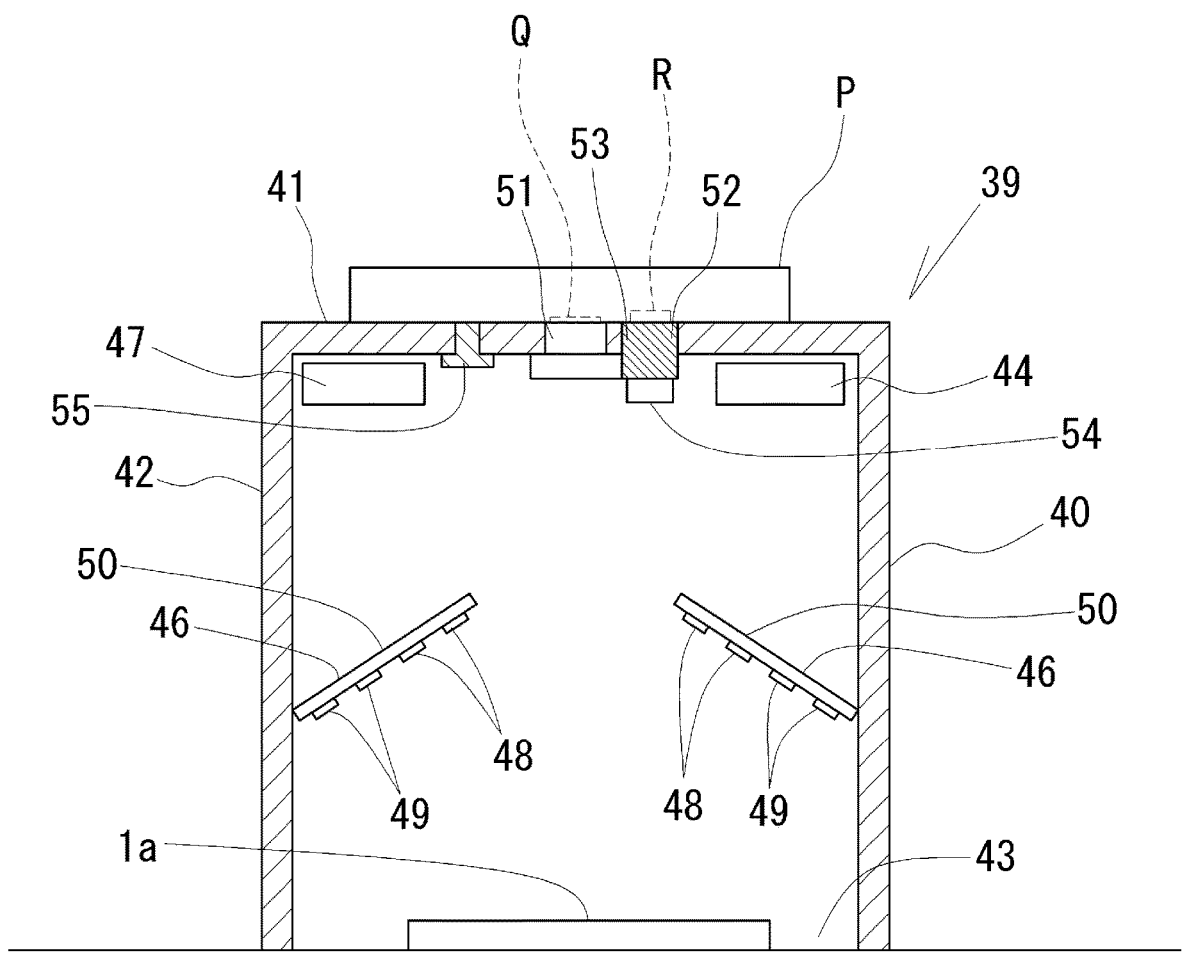
FIG. 9 is a diagram illustrating an internal structure of the reading assist device 39 of the sixth embodiment, with a housing 40 being longitudinally cross-sectioned.

As shown in FIGS. 8 and 9, a reading assist device 39 of the present embodiment is provided with a housing 40. The housing 40, which is in a cubic shape, includes a top plate 41 and side walls 42 and has a bottom portion which serves as an opening 43. The housing 40 is internally provided with a battery 44 as an electrical power source, an irradiation unit 46 that selectively applies white light and infrared light, and a control unit 47 that controls the irradiation unit 46. The irradiation unit 46 has a base 50 on which a white LED 48 for applying white light and an infrared LED 40 for applying infrared light are mounted. The irradiation unit 46 is arranged such that white or infrared light is applied in the direction of the bottom portion of the housing 40.

As shown in FIGS. 8 and 9, the top plate has a center portion where a camera opening 51 is formed so that a back camera of a smartphone P can capture an image of the optical code 1a arranged at the bottom portion of the housing 40. The camera opening 51 is a through hole with a diameter a little larger than a lens Q of the back camera. The top plate 41 has a portion near the camera opening 51, where an illumination opening 52 in an L shape in plan view is formed. The illumination opening 52 is provided with a light guide panel 53. Specifically, the light guide panel 53 is fitted into the illumination opening 52 to diffuse light (visible light) on the inside of the housing. Right beneath the illumination opening 52, a light-receiving sensor 54 is arranged to detect visible light that has passed through the opening 52 and has been diffused by the light guide panel 53. The top plate 41 is provided with a motion sensor 55 for detecting placement of the smartphone P. The motion sensor 55 is a pressure-sensitive switch which is in an on state while the smartphone P is placed on the top plate 41, due to the weight of the smartphone P.

The control unit 47 is configured as a computer including a CPU, a ROM, a RAM, and the like, not shown. When the motion sensor 55 is in an off state, i.e. when the smartphone P (cellular phone) is not placed on the top plate 41, the control unit 47 controls the irradiation unit 46 so as not to apply white light and infrared light.

When the motion sensor 55 is in an on state, i.e. when the smartphone P is placed on the top plate 41, the control unit 47 causes the irradiation unit 46 to selectively apply either white light or infrared light according to the detection state of the light-receiving sensor 54. Specifically, when the motion sensor 55 is in an on state and the light-receiving sensor 54 has detected light, the control unit 47 causes the irradiation unit 46 to apply only white light. When the motion sensor 55 is in an on state and the light-receiving sensor 46 has not detected light, the control unit 47 causes the irradiation unit 46 to apply only infrared light.

The following description addresses a method of reading data recorded in the visible and infrared light recording areas of the optical code 1a, into the smartphone P by using the reading assist device 39. Processes (5) to (9) performed by the smartphone P are the same as those described under the same item names in the second embodiment. Therefore, detailed description is omitted.

(1) Placement of Optical Code

As shown in FIG. 9, a medication packaging box to which the optical code 1 is affixed is arranged at the bottom portion of the housing 40 such that the optical code 1a is on top.

(2) Placement of Smartphone

As shown in FIGS. 8 and 9, the smartphone P is placed on the top plate 41. In this case, the smartphone P is positioned such that the lens Q of the back camera of the smartphone P is located right above the camera opening 51 of the top plate 41 and that an LED light R arranged near the lens Q is located right above the illumination opening 52. At this point, the LED light R of the smartphone P is in an off state.

(3) Infrared Light Imaging Process

An image of the optical code 1a located at the bottom portion is captured through the camera opening 51 by the back camera of the smartphone P placed on the top plate 41. In this case, the motion sensor 55 is in an on state and the LED light of the smartphone P is in an off state. Further, there is no entry of light from the illumination opening 52. Accordingly, the optical code 1a at the bottom portion is in a state of being irradiated with infrared light by the irradiation unit 46. In other words, an image of the optical code 1a is captured with infrared light in the present process.

(4) Visible Light Imaging Process

The LED light R of the smartphone P placed on the top plate 41 is turned on and then an image of the optical code 1a at the bottom portion is captured through the camera opening 51 by the back camera. In this case, the motion sensor 55 is in an on state, and there is an entry of white light emitted from the LED light R through the illumination opening 52, for detection by the light-receiving sensor 54. Accordingly, the optical code 1a at the bottom portion is in a state of being irradiated with white light by the irradiation unit 46. In other words, an image of the optical code 1a is captured with visible light in the present process.

(5) Visible Light Reflection Characteristics Discriminating Process (6) Product Information Reading Process (7) Infrared Light Reflection Characteristics Discriminating Process (8) Authenticating Process (9) Results Outputting Process In this way, using the reading assist device 39 of the present embodiment and the smartphone P, an image of the optical code 1a captured with visible light and an image of the same captured with infrared light can be obtained. Thus, the data recorded in the visible and infrared light recording areas of the optical code 1a of the second embodiment can be more inexpensively read than when using a dedicated reading device. In the present embodiment, white light is applied to the optical code 1a from the irradiation unit 46 arranged in the housing 40 of the reading assist device 39 in the visible light imaging process. As an alternative to the application of white light from the irradiation unit 46, white light of the LED light R of the smartphone P may be applied to the optical code 1a.

The optical code of the present invention may be appropriately modified in the configurations of the foregoing embodiments within the spirit of the present invention. Although the patterns of the light- and dark-color modules of the optical codes of the foregoing embodiments are based on the standard of QR codes, the pattern of the light- and dark-color modules of the optical code of the present invention may be based on the standards of optical codes other than QR codes. Specifically, the pattern may be based on the standards of matrix type two-dimensional codes, such as data matrix, stack type two-dimensional codes, such as PDF 417, or barcodes (EAN/JAN symbols).

The optical codes of the foregoing embodiments are affixed to medication packaging boxes. However, not being limited to packaging boxes, the optical code of the present invention may be affixed to individual packages inside a packaging box, or may be affixed to product tags, or product bodies. Furthermore, not being limited to packages of individual products, the optical code of the present invention may be affixed to cardboard boxes or pallets containing or loading a plurality of products, or to cargo containers. Furthermore, products with affixation of the optical code of the present invention are not limited to medications. The optical code of the present invention may be used for various products, including, for example, luxury brands such as bags or wallets, tickets, or cash vouchers. In the foregoing embodiments, the optical code is directly printed onto the medication packaging box. As an alternative to this, the optical code of the present invention may be printed onto a piece of sheet material and this sheet material may be stuck to a packaging box.

In the foregoing embodiments, the dark-color modules of the optical code are each formed of one type of ink layer. However, one dark-color module may be made up of several types of ink layers. The ink layers forming the dark-color modules are not limited to black-based inks, but may be process inks, or the like. The dark-color modules are not limited to be formed of printing inks, but may be formed of toner inks, or the like. The layers of inks may be laminated on the front surface of a paper base material, or may penetrate the front surface of the paper base material.

With the optical code of the present invention, an optical code to is determined to be a duplicate based on the fact that the pattern of the infrared light reflective dark-color modules and the infrared light absorptive dark-color modules is lost if the optical code is a duplicate. Therefore, the criterion for determining a duplicate is not limited to one described in the foregoing embodiments but may be appropriately changed. For example, in the optical code of the second embodiment, an optical code may be determined not to be a duplicate based on the fact that two kinds of modules i.e. the infrared light reflective dark-color modules and the infrared light absorptive dark-color modules have been identified.

In the foregoing embodiments, the first module (infrared light reflective dark-color module 2ba) and the second module (infrared light absorptive dark-color module 2bb) of the present invention are included in the dark-color module 2b and both are black. As an alternative to this, the first and second modules of the present invention may have colors other than black. The colors of the first and second modules are not required to be completely the same, but preferably are required to have similar visible light reflection characteristics which do not easily enable visual discrimination between the first and second modules.

In the foregoing embodiments, the first module (infrared light reflective dark-color module 2ba) and the second module (infrared light absorptive dark-color module 2bb) of the present invention are both included in the dark-color module 2b. Alternative to this, the first and second modules of the present invention may be included in the light-color module.

In the foregoing embodiments, infrared light with a wavelength of 1,000 nm corresponds to the invisible light with a predetermined wavelength of the present invention. However, the invisible light with a predetermined wavelength of the present invention may be infrared light with a wavelength other than 1,000 nm, or may be light in the ultraviolet range.

PARTIAL REFERENCE SIGNS LIST 1, 1a, 1b . . . Optical code
2 . . . Module
2a . . . Light-color module
2b . . . Dark-color module
2ba . . . Infrared light reflective dark-color module (second invisible light reflective dark-color module)
2baa . . . First infrared light reflective dark-color module (second invisible light reflective dark-color module)
2bab . . . Second infrared light reflective dark-color module (first invisible light reflective dark-color module)
2bb . . . Infrared light absorptive dark-color module (second module)
3 . . . Functional pattern (fixed region)
4 . . . Encoded region
5 . . . Position detection pattern
10 . . . Paper base material (light-color base layer)
11a . . . Infrared light transmissive black ink
11b . . . Infrared light absorptive black ink

What is claimed is:

1. An optical code in which data to be decoded is recorded, comprising:
   a pattern of a plurality of light-color modules having high visible light reflectance;
   a plurality of dark-color modules having visible light reflectance lower than the visible light reflectance of the light-color modules, the data being expressed by the light-color and dark-color modules; and
   a fixed region in which the light-color modules and the dark-color modules are positionally fixedly arranged in advance, the light-color and dark-color modules arranged in the fixed region providing a pattern assisting optical reading of the optical code, wherein:
   at least either the light-color modules or the dark-color modules include a first module and a second module having reflectances different from each other for invisible light of a predetermined wavelength;
   the light-color modules and the dark-color modules are recorded as a module pattern that is different between when irradiated with the visible light and when irradiated with the invisible light having the predetermined wavelength; and
   at least either the light-color modules or the dark-color modules arranged in the fixed region consist of the first module and the second module, the first module and the second module being positionally fixed in advance in the fixed region.

2. The optical code according to claim 1, wherein the fixed region is one of position detection patterns for assisting the optical reading of the optical code.

3. The optical code according to claim 2, wherein the data is recorded with a pattern of the first module and the second module.

4. The optical code according to claim 3, wherein:
   the first module and the second module are included in either the light-color modules or the dark-color modules; and
   the data recorded with a pattern of the first module and the second module includes data in which information of predetermined contents are encrypted.

5. The optical code according to claim 2, wherein the invisible light of a predetermined wavelength is infrared light.

6. The optical code according to claim 2, wherein:
   the dark-color modules are formed on a front surface of a light-color base layer having high reflectance for the visible light and for the invisible light having the predetermined wavelength;
   the first module and the second module are included in the dark-color modules;

in a portion for forming the first module, a first dark-color layer is formed on the front surface of the light-color base layer, the first dark-color layer transmitting the invisible light of a predetermined wavelength and having a dark color;

in a portion for forming the second module, a second dark-color layer is formed on the front surface of the light-color base layer, the second dark-color layer absorbing the invisible light of a predetermined wavelength and having a dark color; and the first module has higher reflectance for the invisible light of a predetermined wavelength, compared to the second module.

7. The optical code according to claim 6, wherein:
the first dark-color layer is formed of an invisible light transmissive layer that transmits the invisible light of a predetermined wavelength; and the second dark-color layer is formed of an invisible light absorptive layer that at least absorbs the invisible light of a predetermined wavelength.

8. The optical code according to claim 6, wherein:
the first module includes:
a first invisible light reflective dark-color module having high reflectance for the invisible light of a predetermined wavelength and high reflectance for invisible light of a second predetermined wavelength that is different from that of the invisible light of a predetermined wavelength; and
a second invisible light reflective dark-color module having high reflectance for the invisible light of a predetermined wavelength and low reflectance for the invisible light of a second predetermined wavelength, the first invisible light reflective dark-color module is formed of a layer that is formed on the front surface of the light-color base layer, the layer of the first invisible light reflective dark-color module transmitting both the invisible light of a predetermined wavelength and the invisible light of a second predetermined wavelength and having a dark color; and the second invisible light reflective dark-color module is formed of a layer that is formed on the front surface of the light-color base layer, the layer of the second invisible light reflective dark-color module transmitting the invisible light of a predetermined wavelength, absorbing the invisible light of a second predetermined wavelength and having a dark color.

9. The optical code according to claim 2, wherein:
the dark-color modules are formed on the front surface of the light-color base layer having high reflectance for the visible light and the invisible light of a predetermined wavelength;

the first module and the second module are included in the dark-color modules;

in a portion for forming the first module, a first dark-color layer is formed on the front surface of the light-color base layer, the first dark-color layer partially transmitting the invisible light of a predetermined wavelength and having a dark color;

in a portion for forming the second module, a second dark-color layer is formed on the front surface of the light-color base layer, the second dark-color layer absorbing the invisible light of a predetermined wavelength and having a dark color; and the first module has higher reflectance for the invisible light of a predetermined wavelength, compared to the second module, and has lower reflectance for the invisible light of a predetermined wavelength, compared to the light-color modules.

10. The optical code according to claim 2, the optical code being affixed to at least any of a product, a product package and a product tag, wherein:
the data recorded with a pattern of the light-color modules and the dark-color modules includes information used for product management.

11. A method of producing an optical code in which data to be decoded is recorded, the code comprising:
a pattern of a plurality of light-color modules having high visible light reflectance;
a plurality of dark-color modules having visible light reflectance lower than the visible light reflectance of the light-color modules, the data being expressed by the light-color and dark-color modules; and
a fixed region in which the light-color modules and the dark-color modules are positionally fixedly arranged in advance, the light-color and dark-color modules in the fixed region providing a pattern assisting optical reading of the optical code, wherein:
at least either the light-color modules or the dark-color modules include a first module and a second module having reflectances different from each other for invisible light of a predetermined wavelength;

the light-color modules and the dark-color modules are recorded as a module pattern that is different between when irradiated with the visible light and when irradiated with the invisible light having the predetermined wavelength; and at least either the light-color modules or the dark-color modules included in the fixed region consist of the first module and the second module, the first module and the second module being positionally fixed in advance in the fixed region, the method comprising:
a first step of deciding a pattern of the light-color modules and the dark-color modules of the optical code used for recording the data;

a second step of deciding either a first module having high reflectance for invisible light of a predetermined wavelength or a second module having low reflectance for the invisible light of a predetermined wavelength, for each of the dark-color modules decided in the first step; and a third step of forming the first module on a front surface of a light-color base layer having high reflectance for the visible light and the invisible light of a predetermined wavelength by providing a first dark-color layer that transmits the invisible light of a predetermined wavelength, and forming the second module on the front surface of the light-color base layer by providing a second dark-color layer that absorbs the invisible light of the predetermined wavelength.

12. A method of authenticating an optical code, in which data to be decoded is recorded, the code comprising:
a pattern of a plurality of light-color modules having high visible light reflectance;
a plurality of dark-color modules having visible light reflectance lower than the visible light reflectance of the light-color modules, the data being expressed by the light-color and dark-color modules; and
a fixed region in which the light-color modules and the dark-color modules are positionally fixedly arranged in advance, the light-color and dark-color modules in the fixed region providing a pattern assisting optical reading of the optical code, wherein:

at least either the light-color modules or the dark-color modules include a first module and a second module having reflectances different from each other, other for invisible light of a predetermined wavelength;

the light-color modules and the dark-color modules are recorded as a module pattern that is different between when irradiated with the visible light and when irradiated with the invisible light having the predetermined wavelength; and at least either the light-color modules or the dark-color modules included in the fixed region consist of the first module and the second module, the first module and the second module being positionally fixed in advance in the fixed region;

the method comprising:

a visible light imaging step of capturing an image of the optical code in the visible light;

an invisible light imaging step of capturing an image of the optical code with the invisible light of a predetermined wavelength;

a visible light discriminating step of discriminating between the light-color modules and the dark-color modules, for at least part of modules included in the optical code, based on an image captured in the visible light imaging step;

an invisible light discriminating step of discriminating between a module having high reflectance for the invisible light of a predetermined wavelength and a module having low reflectance for the invisible light of a predetermined wavelength, for at least part of modules included in the optical code, based on an image captured in the invisible light imaging step;

an invisible light module discriminating step of discriminating between the first module and the second module, for at least part of modules, based on results of the visible light discriminating step and the invisible light discriminating step; and an authenticating step of authenticating the optical code, based on a pattern of the first module and the second module, the pattern being discriminated at least in the invisible light module discriminating step.

13. The method of claim 12, wherein the fixed region is one of position detection patterns for assisting the optical reading of the optical code.

14. A reading device for an optical code in which data to be decoded is recorded, the code comprising:

a pattern of a plurality of light-color modules having high visible light reflectance;

a plurality of dark-color modules having visible light reflectance lower than the visible light reflectance of the light-color modules, the data being expressed by the light-color and dark-color modules; and a fixed region in which the light-color modules and the dark-color modules are positionally fixedly arranged in advance, the light-color and dark-color modules in the fixed region providing a pattern assisting optical reading of the optical code, wherein:

at least either the light-color modules or the dark-color modules being include a first module and a second module having reflectances different from each other for invisible light of a predetermined wavelength;

the light-color modules and the dark-color modules are recorded as a module pattern that is different between when irradiated with the visible light and when irradiated with the invisible light having the predetermined wavelength; and at least either the light-color modules or the dark-color modules included in the fixed region consist of the first module and the second module, the first module and the second module being positionally fixed in advance in the fixed region, the reading device comprising:

an irradiation unit that applies the visible light and the invisible light of a predetermined wavelength to the optical code; and an imaging unit capable of capturing an image in reflected light which is a reflection of the light applied to the optical code from the irradiation unit, wherein the imaging unit includes a visible light recorded data reader reading the data, based on a pattern of modules obtained from an image captured in reflected light that is a reflection of the visible light; and an invisible light recorded data reader reading the data, based on a pattern of modules obtained from an image captured in reflected light that is a reflection of the invisible light of a predetermined wavelength.

15. The reading device for an optical code according to claim 14, wherein the reading device comprises an authentication unit that authenticates the data, based on information read by the visible light recorded data reader and information read by the invisible light recorded data reader.

16. A reading device for an optical code in which data to be decoded is recorded, the code comprising:

a pattern of a plurality of light-color modules having high visible light reflectance;

a plurality of dark-color modules having visible light reflectance lower than the visible light reflectance of the light-color modules, the data being expressed by the light-color and dark-color modules; and a fixed region in which the light-color modules and the dark-color modules are positionally fixedly arranged in advance, the light-color and dark-color modules in the fixed region providing a pattern assisting optical reading of the optical code, wherein:

at least either the light-color modules or the dark-color modules include a first module and a second module having reflectances different from each other for invisible light of a predetermined wavelength;

the light-color modules and the dark-color modules are recorded as a module pattern that is different between when irradiated with the visible light and when irradiated with the invisible light having the predetermined wavelength; and at least either the light-color modules or the dark-color modules included in the fixed region consist of the first module and the second module, the first module and the second module being positionally fixed in advance in the fixed region, the reading device comprising:

an imaging unit that is provided with an imaging device capable of capturing an image in the visible light and invisible light;

an invisible light filter that shields the visible light and transmits the invisible light of a predetermined wavelength;

a visible light filter that shields the invisible light of a predetermined wavelength and transmits the visible light;

a mount/demount mechanism that is capable of selectively mounting/demounting the visible light filter and the invisible light filter to/from a light path; and an irradiation unit that is capable of emitting at least the invisible light of a predetermined wavelength, wherein the reading device is configured to execute:

a visible light imaging process of capturing an image of the optical code, with the invisible light filter being demounted from the light path and the visible light filter being mounted to the light path;

an invisible light imaging process of capturing an image of the optical code imaged in the visible light imaging process, with the visible light filter being demounted from the light path and the invisible light filter being mounted to the light path;

a visible light recording data reading process of reading the data, based on an image captured in the visible light imaging process; and an authenticating process of authenticating the optical code, at least based on an image captured in the visible light imaging process.

17. A reading assist device that allows a smartphone to read a pattern of the modules readable when visible light is applied to an optical code, and a pattern of the modules readable when the invisible light of a predetermined wavelength is applied to the optical code, data to be decoded is recorded in the optical code, the optical code comprising:

a pattern of a plurality of light-color modules having high visible light reflectance;

a plurality of dark-color modules having visible light reflectance lower than the visible light reflectance of the light-color modules, the data being expressed by the light-color and dark-color modules; and a fixed region in which the light-color modules and the dark-color modules are positionally fixedly arranged in advance, the light-color and dark-color modules in the fixed region providing a pattern assisting optical reading of the optical code, wherein:

at least either the light-color modules or the dark-color modules include a first module and a second module having reflectances different from each other for invisible light of a predetermined wavelength;

the light-color modules and the dark-color modules are recorded as a module pattern that is different between when irradiated with the visible light and when irradiated with the invisible light having the predetermined wavelength; and at least either the light-color modules or the dark-color modules included in the fixed region consist of the first module and the second module, the first module and the second module being positionally fixed in advance in the fixed region, the assist device comprising:

a housing that has at least a top plate and side walls and is configured to arrange the optical code at a bottom portion;

an irradiation unit that is disposed inside the housing to apply the invisible light of a predetermined wavelength to the bottom portion of the housing; and a control unit that controls application of the invisible light of a predetermined wavelength by the irradiation unit, wherein:

the top plate of the housing is provided with a camera opening enabling passage of at least visible light and the invisible light of a predetermined wavelength, with an illumination opening enabling passage of at least visible light being formed near the camera opening;

the reading assist device further includes a light-receiving sensor inside the housing to detect light passing through the illumination opening; and the control unit allows the irradiation unit to apply the invisible light of a predetermined wavelength under conditions that no light passing through the illumination opening is being detected by the light-receiving sensor, and does not allow the irradiation unit to apply the invisible light of a predetermined wavelength when light passing through the illumination opening is at least being detected by the light-receiving sensor.

18. The reading assist device 17, wherein the fixed region is one of position detection patterns for assisting the optical reading of the optical code.

* * * * *